US008731459B2

(12) United States Patent
Spurgat et al.

(10) Patent No.: US 8,731,459 B2
(45) Date of Patent: May 20, 2014

(54) SHARING DIGITAL CONTENT AMONG MULTIPLE DEVICES

(75) Inventors: Jeffrey Jonathan Spurgat, Madison, WI (US); Stephen Christopher Gladwin, Chicago, IL (US); Hoyet Harrison Andrews, III, San Antonio, TX (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/621,070

(22) Filed: Sep. 15, 2012

(65) Prior Publication Data
US 2013/0072108 A1    Mar. 21, 2013

Related U.S. Application Data

(60) Continuation of application No. 13/101,581, filed on May 5, 2011, which is a division of application No. 12/576,465, filed on Oct. 9, 2009, now abandoned, which is a continuation of application No. 09/858,415, filed on May 16, 2001, now Pat. No. 7,620,363.

(51) Int. Cl.
H04H 20/71 (2008.01)

(52) U.S. Cl.
USPC ....... 455/3.05; 455/3.01; 455/3.06; 455/41.2; 455/418; 455/420; 455/500; 455/502; 455/414.1; 455/414.2; 709/208; 709/211; 709/216; 709/248

(58) Field of Classification Search
USPC ............ 455/66.1, 41.1–41.2, 3.01–3.06, 455/418–420, 500, 502, 517–519, 455/414.1–414.2, 456.1, 456.3, 456.5, 455/456.6; 709/208, 211, 213, 216, 231, 709/248
See application file for complete search history.

(56) References Cited

U.S. PATENT DOCUMENTS

| 5,109,484 A | | 4/1992 | Hughes et al. | |
|---|---|---|---|---|
| 5,421,030 A | | 5/1995 | Baran | |
| 5,666,530 A | | 9/1997 | Clark et al. | |
| 5,727,202 A | | 3/1998 | Kucala | |
| 5,819,160 A | * | 10/1998 | Foladare et al. | 455/45 |
| 5,905,719 A | | 5/1999 | Arnold et al. | |
| 5,923,757 A | | 7/1999 | Hocker et al. | |
| 5,969,678 A | * | 10/1999 | Stewart | 342/457 |
| 5,974,238 A | | 10/1999 | Chase, Jr. | |
| 5,974,312 A | | 10/1999 | Hayes et al. | |
| 6,035,349 A | | 3/2000 | Ha et al. | |
| 6,061,306 A | | 5/2000 | Buchheim | |
| 6,064,379 A | | 5/2000 | DeMoney | |

(Continued)

OTHER PUBLICATIONS

U.S. Appl. No. 09/858,415, Apr. 7, 2004, Office Action.

(Continued)

*Primary Examiner* — Tuan A Tran
(74) *Attorney, Agent, or Firm* — Keller Jolley Preece

(57) ABSTRACT

A wireless communication system and in particular a wireless communication system for digital audio players that provides for increased functionality, such as communication, interaction and synchronization between a computing platform and various mobile, portable or fixed digital audio players, as well as providing a communication link between the various digital audio players themselves. The computing platform may act, for example, through a wireless network or wireless communication platform, to control the digital audio players; to act as a cache of digital audio data for the digital audio players; as well as provide a gateway to the Internet to enable the digital audio players to access additional digital audio content and other information.

32 Claims, 27 Drawing Sheets

(56) References Cited

U.S. PATENT DOCUMENTS

| | | | |
|---|---|---|---|
| 6,072,468 | A | 6/2000 | Hocker et al. |
| 6,192,340 | B1 | 2/2001 | Abecassis |
| 6,201,176 | B1 | 3/2001 | Yourlo |
| 6,202,008 | B1 | 3/2001 | Beckert et al. |
| 6,202,109 | B1 | 3/2001 | Salo et al. |
| 6,295,541 | B1 | 9/2001 | Bodnar et al. |
| 6,330,618 | B1 | 12/2001 | Hawkins et al. |
| 6,477,117 | B1 * | 11/2002 | Narayanaswami et al. ... 368/251 |
| 6,522,886 | B1 | 2/2003 | Youngs et al. |
| 6,678,215 | B1 * | 1/2004 | Treyz et al. ............ 368/10 |
| 6,697,649 | B1 | 2/2004 | Bennett et al. |
| 6,714,797 | B1 | 3/2004 | Rautila |
| 6,754,468 | B1 * | 6/2004 | Sieben et al. ............ 455/41.2 |
| 6,774,951 | B2 | 8/2004 | Narushima |
| 6,874,037 | B1 | 3/2005 | Abram et al. |
| 6,931,429 | B2 | 8/2005 | Gouge et al. |
| 6,931,454 | B2 | 8/2005 | Deshpande et al. |
| 6,938,100 | B2 | 8/2005 | Kang |
| 7,587,446 | B1 | 9/2009 | Onyon et al. |
| 7,620,363 | B2 * | 11/2009 | Spurgat et al. ............ 455/3.05 |
| 7,890,661 | B2 | 2/2011 | Spurgat |
| 8,073,380 | B2 | 12/2011 | Koli et al. |
| 2002/0002039 | A1 | 1/2002 | Qureshey et al. |
| 2002/0013852 | A1 | 1/2002 | Janik et al. |
| 2002/0022453 | A1 | 2/2002 | Balog et al. |
| 2002/0069218 | A1 | 6/2002 | Sull et al. |
| 2002/0087996 | A1 | 7/2002 | Bi et al. |
| 2002/0099772 | A1 | 7/2002 | Deshpande et al. |
| 2002/0114350 | A1 | 8/2002 | Tang et al. |
| 2002/0116533 | A1 | 8/2002 | Holliman et al. |
| 2002/0132616 | A1 | 9/2002 | Ross et al. |
| 2002/0164973 | A1 | 11/2002 | Janik et al. |
| 2002/0164995 | A1 | 11/2002 | Brown et al. |
| 2002/0174243 | A1 | 11/2002 | Spurgat |
| 2003/0079038 | A1 | 4/2003 | Robbin et al. |
| 2005/0091683 | A1 | 4/2005 | Sheynman et al. |
| 2007/0198414 | A1 | 8/2007 | Derrenberger |
| 2010/0173579 | A1 | 7/2010 | Spurgat |
| 2011/0207396 | A1 | 8/2011 | Spurgat |
| 2012/0030361 | A1 | 2/2012 | Spurgat |
| 2013/0072109 | A1 | 3/2013 | Spurgat |
| 2013/0073737 | A1 | 3/2013 | Spurgat |
| 2013/0080582 | A1 | 3/2013 | Spurgat |

OTHER PUBLICATIONS

U.S. Appl. No. 09/858,415, Jan. 12, 2005, Office Action.
U.S. Appl. No. 09/858,415, Jun. 30, 2005, Office Action.
U.S. Appl. No. 09/858,415, Dec. 13, 2005, Office Action.
U.S. Appl. No. 09/858,415, Jun. 8, 2006, Office Action.
U.S. Appl. No. 09/858,415, Jan. 4, 2007, Office Action.
U.S. Appl. No. 09/858,415, Aug. 24, 2007, Office Action.
U.S. Appl. No. 09/858,415, Dec. 23, 2008, Office Action.
U.S. Appl. No. 09/858,415, Jul. 10, 2009, Notice of Allowance.
U.S. Appl. No. 09/858,810, Sep. 10, 2004, Office Action.
U.S. Appl. No. 09/858,810, Apr. 21, 2005, Office Action.
U.S. Appl. No. 09/858,810, Dec. 9, 2005, Office Action.
U.S. Appl. No. 09/858,810, Dec. 8, 2006, Office Action.
U.S. Appl. No. 09/858,810, May 31, 2007, Office Action.
U.S. Appl. No. 09/858,810, Nov. 14, 2007, Office Action.
U.S. Appl. No. 09/858,810, Jun. 13, 2008, Office Action.
U.S. Appl. No. 09/858,810, Mar. 19, 2009, Office Action.
U.S. Appl. No. 09/858,810, Nov. 6, 2009, Office Action.
U.S. Appl. No. 09/858,810, May 6, 2010, Office Action.
U.S. Appl. No. 09/858,810, Oct. 8, 2010, Notice of Allowance.
U.S. Appl. No. 09/859,057, Aug. 31, 2004, Office Action.
U.S. Appl. No. 09/859,057, Apr. 21, 2005, Office Action.
U.S. Appl. No. 09/859,057, Dec. 9, 2005, Office Action.
U.S. Appl. No. 09/859,057, Aug. 28, 2006, Office Action.
U.S. Appl. No. 09/859,057, Dec. 21, 2006, Office Action.
U.S. Appl. No. 09/859,057, Sep. 19, 2007, Office Action.
U.S. Appl. No. 09/859,057, Apr. 1, 2008, Office Action.
U.S. Appl. No. 09/859,057, Dec. 31, 2008, Office Action.
U.S. Appl. No. 09/859,057, Jul. 23, 2009, Office Action.
U.S. Appl. No. 09/859,057, Jul. 20, 2010, Office Action.
U.S. Appl. No. 09/859,057, Dec. 9, 2010, Office Action.
U.S. Appl. No. 09/859,057, Jun. 13, 2011, Office Action.
U.S. Appl. No. 09/859,057, Sep. 18, 2013, Notice of Allowance.
U.S. Appl. No. 12/576,465, Aug. 31, 2010, Office Action.
U.S. Appl. No. 12/576,465, Jul. 8, 2011, Office Action.
U.S. Appl. No. 13/019,783, Jan. 31, 2013, Office Action.
U.S. Appl. No. 13/019,783, Jun. 20, 2013, Office Action.
U.S. Appl. No. 13/019,783, Dec. 5, 2013, Office Action.
U.S. Appl. No. 13/101,581, Jun. 27, 2011, Office Action.
U.S. Appl. No. 13/101,581, Dec. 23, 2011, Office Action.
U.S. Appl. No. 13/612,837, Mar. 1, 2013, Office Action.
U.S. Appl. No. 13/612,837, Jun. 25, 2013, Office Action.
U.S. Appl. No. 13/614,990, Mar. 1, 2013, Office Action.
U.S. Appl. No. 13/614,990, Jun. 25, 2013, Office Action.
U.S. Appl. No. 13/621,071, Apr. 15, 2013, Office Action.
U.S. Appl. No. 13/621,071, Sep. 12, 2013, Office Action.
U.S. Appl. No. 13/621,071, Nov. 14, 2013, Notice of Allowance.
U.S. Appl. No. 09/859,057, Jan. 2, 2014, Notice of Allowance.

* cited by examiner

SHARING DIGITAL CONTENT AMONG MULTIPLE DEVICES

CROSS-REFERENCE TO RELATED APPLICATIONS

The present application is a continuation of U.S. application Ser. No. 13/101,581 filed May 5, 2011, which is a division of U.S. application Ser. No. 12/576,465 filed Oct. 9, 2009, which is a continuation of U.S. application Ser. No. 09/858,415, which is now issued as U.S. Pat. No. 7,620,363. Each of the aforementioned application(s) and patent(s) are hereby incorporated by reference in their entirety.

BACKGROUND OF THE INVENTION

1. Field of the Invention

The present invention relates to a wireless communication system and more particularly to a wireless communication system for digital audio players for providing increased functionality including communication, interaction and synchronization between a computing platform and various digital audio players as well as communication among the digital audio players themselves.

2. Description of the Prior Art

A multitude of different devices for digital audio playback are known. Handheld or portable audio players, mobile as well as fixed audio players are known. Examples of such handheld audio players are compact disc (CD) players and MP3 players. Such mobile audio players include audio players, such as CD players, mounted in vehicles. Such mobile audio players are known to be mounted either in-dash in the vehicle or in the case of conversion vans and recreational vehicles in ceiling of the vehicle. Examples of fixed digital audio playback devices include stand-alone players, such as boom boxes and rack players that are adapted to connect to a home stereo system and to an AC power source.

Digital audio content from the Internet is known to be downloaded onto storage devices, such as CDs, by way of a personal computer. Such Internet-based digital audio content has also been downloaded onto portable MP3 audio players. Although such systems allow selected digital audio content to be played when desired by the user, such systems only allow rather limited functionality. As such, various functions, such as interaction, communication and synchronizing the digital content on a plurality of digital audio players must be done manually. Thus, there is a need for system for providing increased functionality of various digital audio players.

SUMMARY OF THE INVENTION

The present invention relates to a wireless communication system and in particular to a wireless communication system for digital audio players that provides for increased functionality, such as communication, interaction and synchronization between a computing platform and various mobile, portable or fixed digital audio players, as well as providing a communication link between the various digital audio players themselves. The computing platform may act, for example, through a wireless network or wireless communication platform, to control the digital audio players; to act as a cache of digital audio data for the digital audio players; as well as provide a gateway to the Internet to enable the digital audio players to access additional digital audio content and other information. The computing platform may also be used to automatically update digital audio content on the digital audio players; synchronize digital audio content and playlists between digital audio players; and automatically continue a particular playlist as the user moves from one digital audio player to another.

DESCRIPTION OF THE DRAWINGS

These and other advantages of the present invention will be readily understood with reference to the following specification and attached drawings wherein.

DETAILED DESCRIPTION

Figure 1:
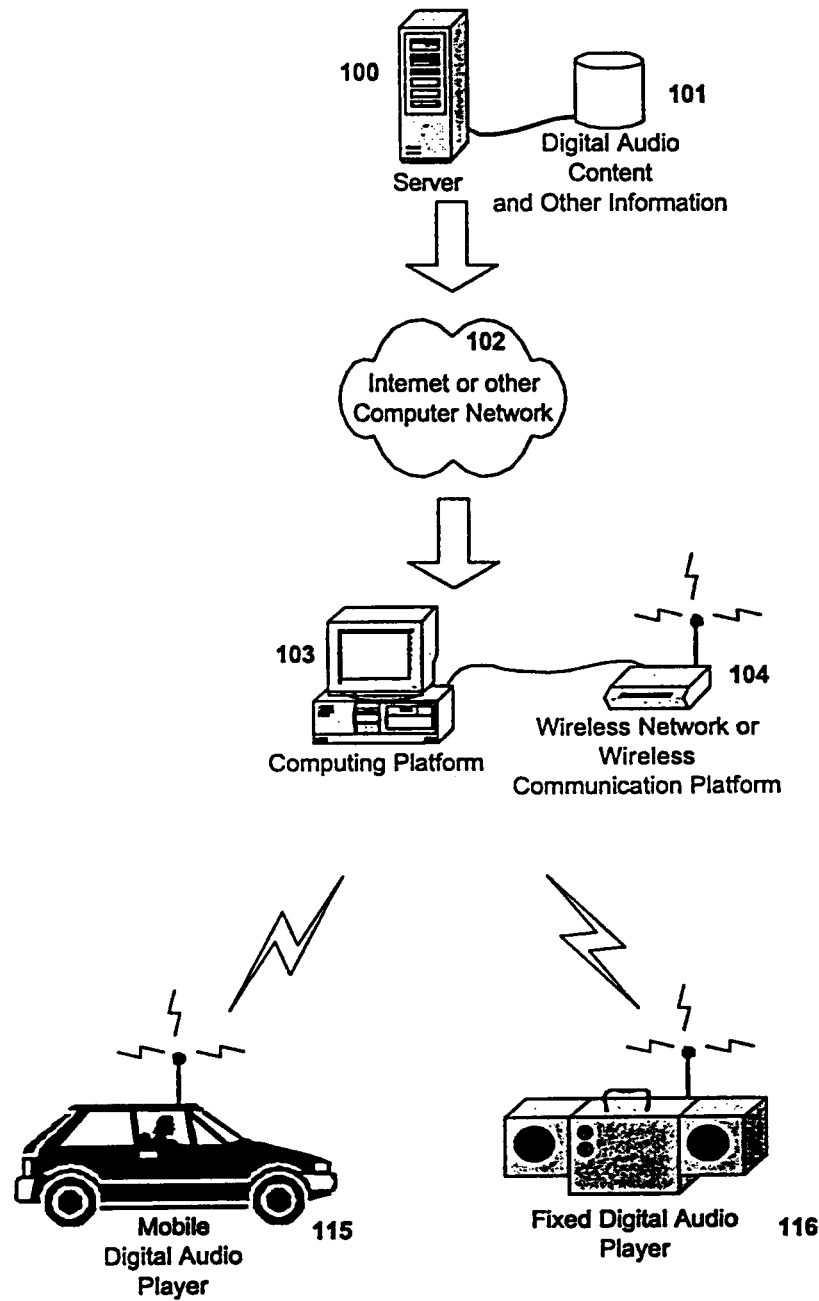
FIG. 1 is a block diagram of a digital audio communication system in accordance with the present invention.
Figure 3:
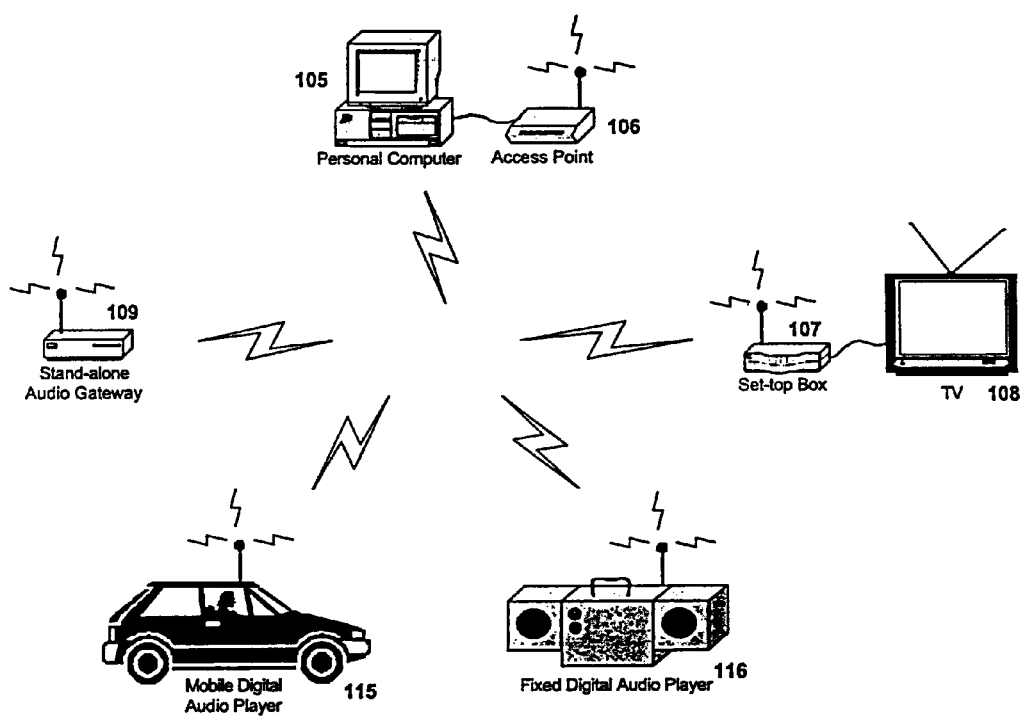
FIG. 3 is a block diagram of a wireless communication network which includes various digital audio players in accordance with the present invention.

The present invention is adapted to provide additional functionality of digital audio players. For example, in one embodiment, as illustrated in FIG. 1, a computing platform 103, for example, a personal computer, is used as a gateway to enable various digital audio players 115 and 116 to be connected to the Internet or other computer network 102. In this embodiment, the computing platform 103 may be configured to access one or more servers 100 on the Internet or other computer network 102 that contain digital audio content and other information 101, such as artists, track names, album names, lyrics, and playlists, among other things. Though the computing platform 103 can act as a digital audio player by itself, in this embodiment of the invention, the computing platform 103 acts as an audio gateway for various digital audio players 115 and 116, and can additionally provide caching of the digital audio content and other information 101 for the digital audio players 115 and 116 from the servers 100 that are connected to the computing platform 103 through the Internet or other computer network 102. Using a wireless network or wireless communication platform 104, the computing platform 103 is adapted to communicate with various digital audio players, such as one or more mobile digital audio players 115 and fixed digital audio players 116 that are within range of the wireless network or wireless communication platform 104 forming a local wireless network as generally illustrated in FIG. 3.

Figure 2:
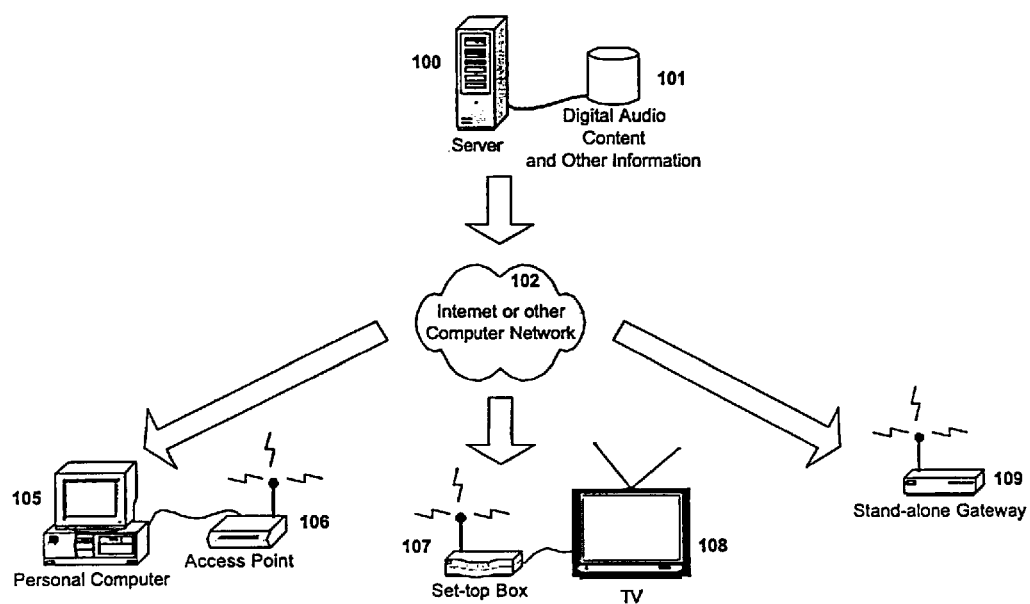
FIG. 2 is a block diagram of a digital audio gateway in accordance with the present invention.

Various devices are contemplated for use as audio gateways, for example, as shown in FIG. 2. In one embodiment, a personal computer 105 coupled to an internal or external wireless communication network or wireless communication platform 104, for example, an access point 106, is used as an audio gateway. Alternatively, a set top box 107 with a wireless network or wireless communication platform 104, coupled to a conventional TV 108, may be used as an audio gateway. A stand alone audio gateway 109 may also be formed from a wireless network or wireless communication platform 104. Other embodiments of an audio gateway are also contemplated. For example, any device with a wireless network or wireless communication platform 104, either public or private, may be used.

In another embodiment of the invention, the computing platform 103 may be configured to automatically synchronize, or upon request, copy, add or remove digital audio content and other information 101, such as playlists, on mobile digital audio players 115 and fixed digital audio players 116. The computing platform 103 may also be used to control mobile digital audio players 115 and fixed digital audio players 116 by changing the current playlist or the currently playing digital audio content, among other things, on the mobile digital audio players 115 or fixed digital audio players 116.

Figure 7:
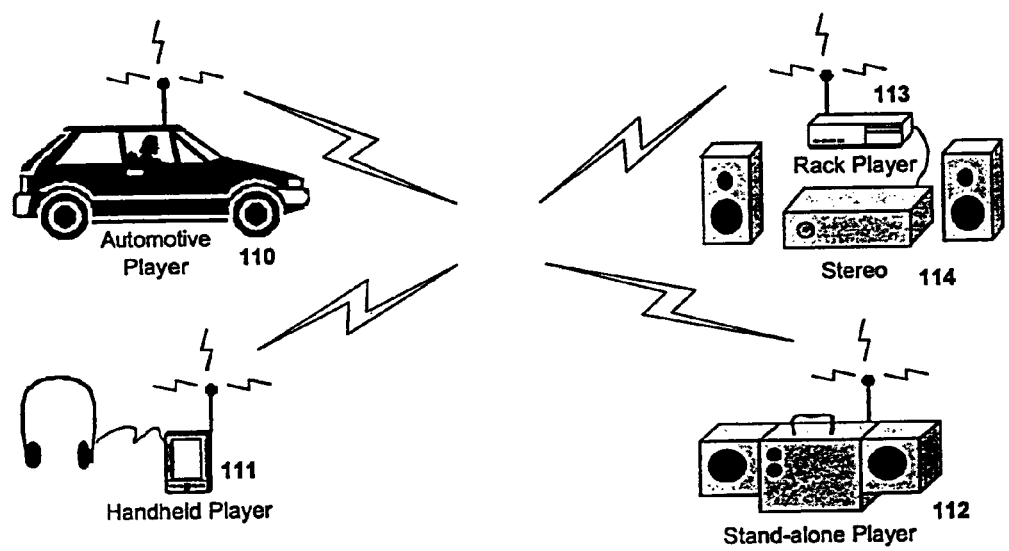
FIG. 7 is a block diagram of a communication network between various digital audio players in accordance with another aspect of the present invention.

In another embodiment of the invention as illustrated in FIG. 7, the system enables communication between various digital audio players, such as the digital audio players 110-113. This embodiment may be also incorporated with a computing platform 103, for example, acting as a gateway, as discussed above, or alternatively using the computing platform 103 for synchronization among the various digital audio players 110-113 or other functions, such as those discussed above.

Audio Gateway

Figure 4:
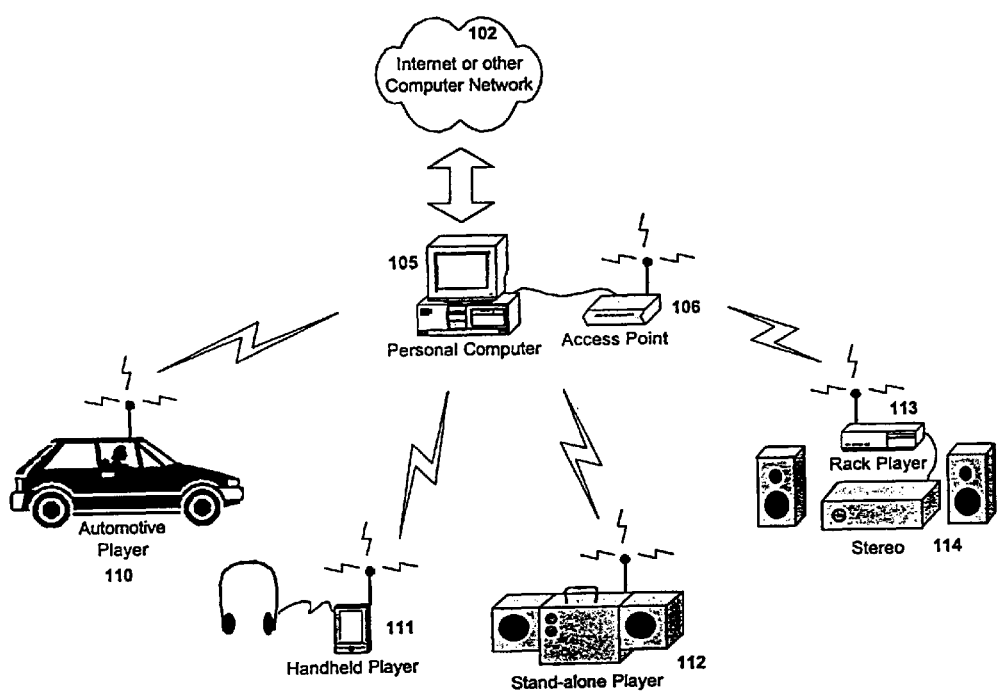
FIG. 4 is a block diagram of a system which utilizes a personal computing platform for communicating with a plurality of audio players.
Figure 5:
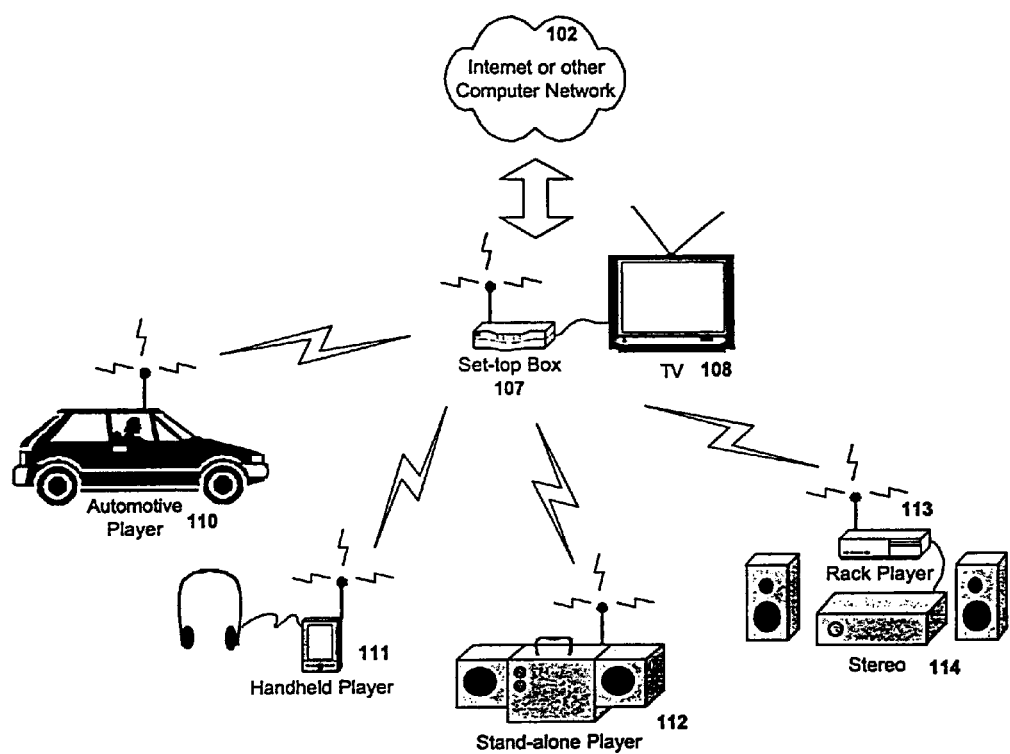
FIG. 5 is an alternate embodiment of the invention which illustrates the use of a television set top box as a communication link for communicating with a plurality of digital audio players in accordance with an alternate embodiment of the invention.
Figure 6:
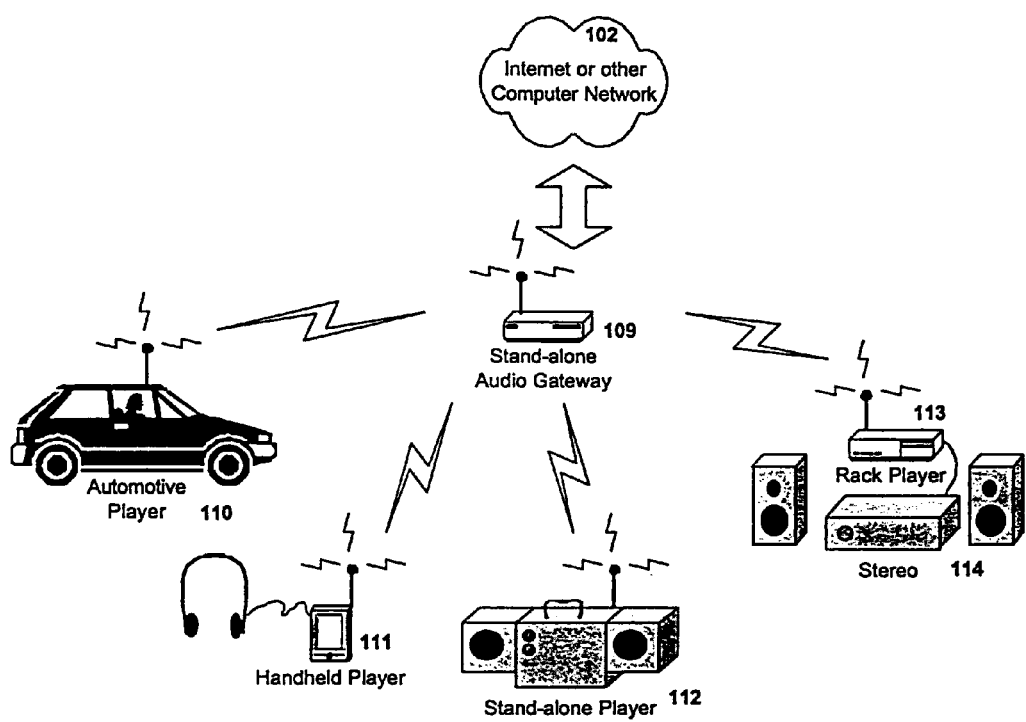
FIG. 6 is a block diagram of an alternate embodiment of the invention which illustrates a communication system between a number of digital audio players and stand-alone audio gateway.

FIGS. 4-6 represent an exemplary network configuration, utilizing different audio gateways for enabling connection of the digital audio players 110-113 to the Internet or other computer network 102. These examples are by no means the only possible configurations that support the invention and do not necessarily cover all aspects of the invention.

Personal Computer and Digital Audio Players Configuration

The first exemplary configuration, shown in FIG. 4, uses a personal computer 105 as the audio gateway. The personal computer 105 connects to the Internet or other computer network 102 using a conventional network interface or modem 137. The personal computer 105 is thus able to download digital audio content and other information 101 from the server 100 (FIG. 1) connected to the Internet or other computer network 102. The digital audio content and other information 101, such as artists, track names, album names, lyrics, and playlists, can then be stored in a persistent storage 133 (FIG. 8), such as a hard drive, on the personal computer 105. The user can also create new playlists using the personal computer 105.

In this embodiment, a wireless access point 106 is used to access the wireless network or wireless communication platform 104. The wireless network or wireless communication platform 104 is used by the personal computer 105, acting as the audio gateway, to communicate with mobile digital audio players 115 and fixed digital audio players 116. The personal computer 105, using the wireless network or wireless communication platform 104, is able to, either automatically or at user request, pass the digital audio content and other information 101, including new playlists, to mobile digital audio players 115 and fixed digital audio players 116. If a fixed digital audio player 116, such as a stand-alone player 112 or a rack player 113 that connects to a stereo 114, happens to be turned off at the time, then the personal computer 105 is able to automatically detect the next time the fixed digital audio player 116 is turned on. When the personal computer 105 detects that a fixed digital audio player 116 has just turned on, then the personal computer 105 can pass the digital audio content and other information 101 to the fixed digital audio player 116 at that time. Mobile digital audio players 115, such as automotive players 110 and handheld players 111, may be out of range of the wireless network or wireless communication platform 104 during normal use. When a mobile digital audio player 115 comes into range of the wireless network or wireless communication platform 104, the personal computer 105, acting as an audio gateway, can automatically detect the mobile digital audio player 115 and pass the digital audio content and other information 101 at that time.

In addition, the personal computer 105 can, either automatically or upon user request, determine the current playlist and current position within the playlist on a particular mobile digital audio player 115 or fixed digital audio player 116. Then the personal computer 105 can propagate this playlist information to any other mobile digital audio players 115 and fixed digital audio players 116 that are on and in range. This allows a user to move from one mobile digital audio player 115 or fixed digital audio player 116 to another mobile digital audio player 115 or fixed digital audio player 116 and automatically be able to continue the same music and playlist in a seamless manner.

Set-Top Box and Digital Audio Players Configuration

Another exemplary configuration, shown in FIG. 5, uses a set-top box 107 as the audio gateway. The set-top box 107 can connect to the Internet or other computer network 102 either through the same cable or by way of a satellite connection that provides the analog or digital audio or video 151 (FIG. 8) that is passed to an audio or video playback device, such as a television set 108, or through an internal or external network interface or modem 137. The set-top box 107 can thus download digital audio content and other information 101 from a server 100, connected to the Internet or other computer network 102. The digital audio content and other information 101, such as artists, track names, album names, lyrics, and playlists, can then be stored in persistent storage 133, such as a hard drive or flash memory, on the set-top box 107.

In this embodiment, a wireless network interface or wireless communication interface 141 is used to handle the wireless network or wireless communication platform 104. The set-top box 107, acting as the audio gateway, uses the wireless network or wireless communication platform 104 to communicate with mobile digital audio players 115 and the fixed digital audio players 116. The set-top box 107, using the wireless network or wireless communication platform 104, is able to, either automatically or upon user request, pass the digital audio content and other information 101 to mobile digital audio players 115 and fixed digital audio players 116.

If a fixed digital audio player 116, such as a stand-alone player 112 or a rack player 113 that connects to a stereo 114, happens to be turned off at the time, then the set-top box 107 is able to automatically detect the next time the fixed digital audio player 116 is turned on. When the set-top box 107 detects that a fixed digital audio player 116 has just turned on, then the set-top box 107 can pass the digital audio content and other information 101 to the fixed digital audio player 116 at that time. Mobile digital audio players 115, such as automotive players 110 and handheld players 111, are typically out of range of the wireless network or wireless communication platform 104 during normal use.

When a mobile digital audio player 115 comes into range of the wireless network or wireless communication platform 104, the set-top box 107, acting as an audio gateway, can automatically detect the mobile digital audio player 115 and pass the digital audio content and other information 101 at that time. In addition, the set-top box 107 can determine, either automatically or upon user request, the current playlist and current position within the playlist on a particular mobile digital audio player 115 or fixed digital audio player 116. Then the set-top box 107 can propagate this playlist information to any other mobile digital audio players 115 and fixed digital audio players 116 that are on and in range. This allows a user to move from one mobile digital audio player 115 or fixed digital audio player 116 to another mobile digital audio player 115 or fixed digital audio player 116 and automatically be able to continue the same music and playlist in a seamless manner.

Stand-Alone Gateway and Digital Audio Players Configuration

Another exemplary configuration, shown in FIG. 6, uses a stand-alone audio gateway 109 as the audio gateway. The stand-alone audio gateway 109 connects to the Internet or other computer network 102 using a network interface or modem 137. The stand-alone audio gateway 109 can download digital audio content and other information 101 from a server 100 connected to the Internet or other computer network 102. The digital audio content and other information 101, such as artists, track names, album names, lyrics, and playlists, can then be stored in persistent storage 133, such as a hard drive or flash memory, on the stand-alone audio gateway 109. In this embodiment, a wireless network interface or wireless communication interface 141 (FIG. 8) is used to handle the wireless network or wireless communication platform 104. The wireless network or wireless communication platform 104 is used by the stand-alone audio gateway 109 to communicate with mobile digital audio players 115 and fixed digital audio players 116. The stand-alone audio gateway 109, using the wireless network or wireless communication platform 104, is able to, either automatically or at user request, pass the digital audio content and other information 101 to mobile digital audio players 115 and fixed digital audio players 116. If a fixed digital audio player 116, such as a stand-alone player 112 or a rack player 113 that connects to a stereo 114, happens to be turned off at the time, then the stand-alone audio gateway 109 is able to automatically detect the next time the fixed digital audio player 116 is turned on. When the stand-alone audio gateway 109 detects that a fixed digital audio player 116 has just turned on, then the stand-alone audio gateway 109 can pass the digital audio content and other information 101 to the fixed digital audio player 116 at that time.

Mobile digital audio players 115, such as automotive players 110 and portable or handheld players 111, may be out of range of the wireless network or wireless communication platform 104 during normal use. When a mobile digital audio player 115 comes into range of the wireless network or wireless communication platform 104, the stand-alone audio gateway 109 can automatically detect the mobile digital audio player 115 and pass the digital audio content and other information 101 at that time.

In addition, the stand-alone audio gateway 109 can, either automatically or upon user request, determine the current playlist and current position within the playlist on a particular mobile digital audio player 115 or fixed digital audio player 116. Then the stand-alone audio gateway 109 can propagate this playlist information to any other mobile digital audio players 115 and fixed digital audio players 116 that are on and in range. This allows a user to move from one mobile digital audio player 115 or fixed digital audio player 116 to another mobile digital audio player 115 or fixed digital audio player 116 and automatically be able to continue the same music and playlist in a seamless manner.

Local Wireless Network

In another embodiment, shown in FIG. 3, a local wireless network is formed which enables wireless communication between a host, such as a personal computer 105, a stand alone audio gateway 109, a set top box 107, and various digital audio players, such as mobile digital audio players 115, fixed digital audio players 116, a stand alone audio gateway 109 and a set top box 107, for example, configured in a star topography. As shown, various audio gateways are used to establish the network. However, in this embodiment, audio gateways, which contain a wireless network or wireless communication platform 104 as discussed above, are used primarily for establishing network communication and may or may not be connected to a remote server 100.

Wireless communications between the computing platform 103 and mobile digital audio players 115 and fixed digital audio players 116, can be done using industry standard wireless communications and networking technology, such as Bluetooth, HomeRF, and IEEE 802.11. In addition, with respect to this invention, a proprietary wireless communications technology may also be used for wireless communications. Use of the wireless network or wireless communication platform 104 by computing platforms 103, mobile digital audio players 115, and fixed digital audio players 116 may be handled as an internal or external peripheral in the form of a wireless network interface or wireless communication interface 141. The wireless network or wireless communication platform 104 may also require an external wireless access point 106 to handle or facilitate wireless communications and to act as a bridge between the wireless network and wired networking connections, such as may be used by a personal computer 105.

Communication Between Digital Audio Players

FIG. 7 illustrates a wireless network configuration which enables communication directly among various digital audio players without a host. The various digital audio players, such as mobile digital audio players 115 and fixed digital audio players 116, use the same wireless network or wireless communication platform 104 that is used to wirelessly communicate with the computing platform 103, to communicate with each other. The wireless communication between the various digital audio players may be handled by an internal or external wireless network interface or wireless communication interface 141 (FIGS. 10 and 11) in each of the disposed digital audio players. In this embodiment, communication between the various digital audio players include directly passing digital audio content and other information 101, including playlists from, for example, one mobile digital audio player 115 or fixed digital audio player 116 to another.

Computing and Player Architectures

Figure 8:
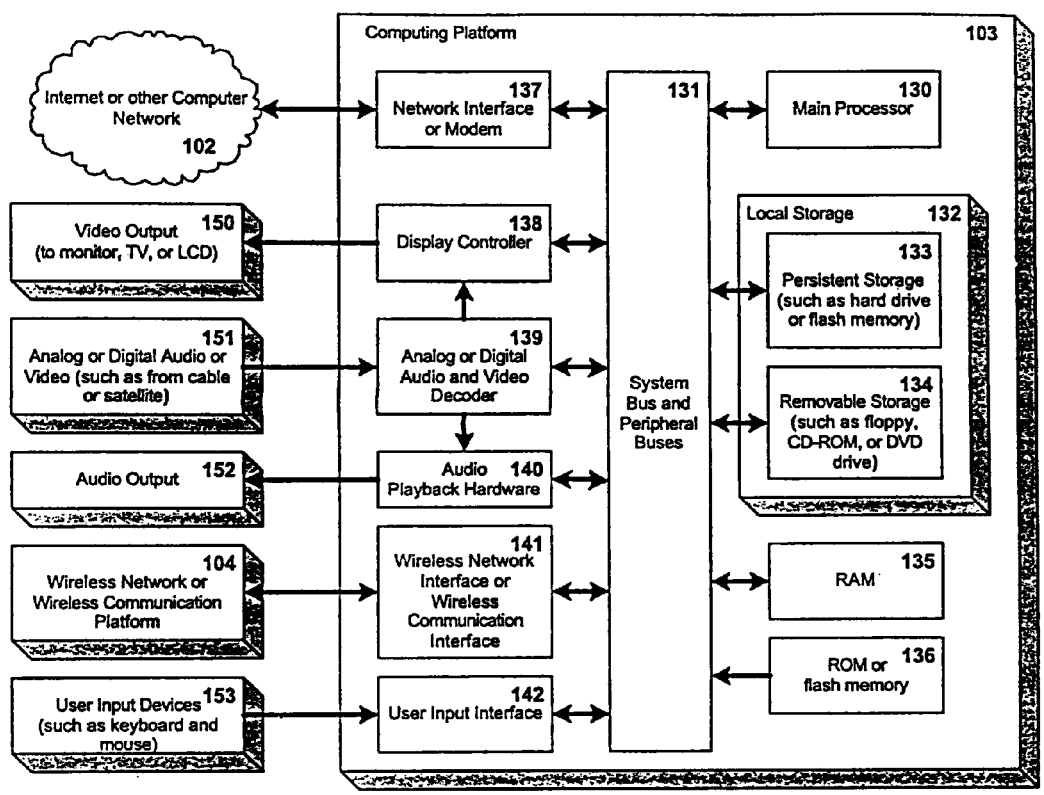
FIG. 8 is a block diagram of the computing platform in accordance with the present invention.
Figure 9:
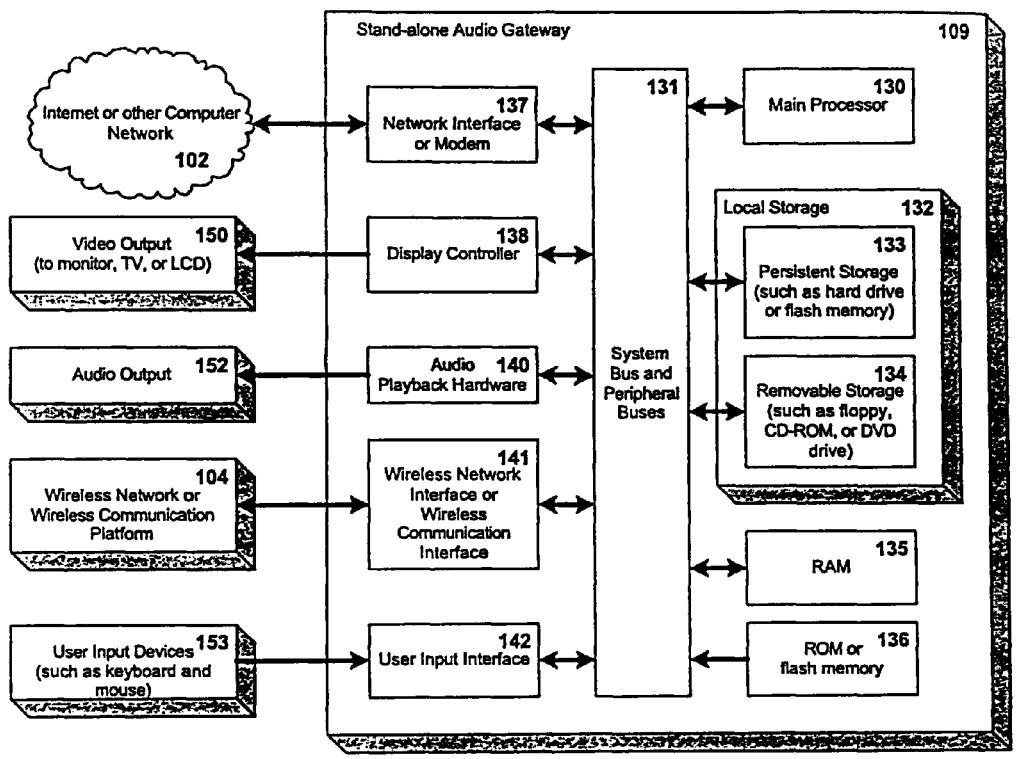
FIG. 9 is a block diagram of a stand-alone audio gateway in accordance with the present invention.

FIGS. 8 and 9 illustrate architectures for the computing platform and stand-alone audio gateway platforms. FIGS. 10-15 illustrate the architectures for the various digital audio player platforms. As shown, the architecture of the various platforms is similar. Thus, like reference numbers are used for like components for clarity.

Computing Platform

FIG. 8 illustrates the typical system architecture of a computing platform 103, which can encompass anything from general-purpose devices, such as personal computers 105, to open fixed function devices, such as set-top boxes 107 or stand-alone audio gateways 109, among others. In general, the computing platform 103 has a main processor 130, such as an Intel Pentium III, for executing various software components. The various software instructions are typically stored in read only memory, or ROM, or flash memory 136, or local storage 132. The local storage 132 can consist of persistent storage 133, such as hard drives or flash memory, or removable storage 134, such as floppy drives, CD-ROM drives, or DVD drives. The software instructions may be executed by the main processor 130 directly from their storage location or loaded into random access memory or RAM 135 to be executed from RAM 135 by the main processor 130. The local storage 132 can also be used to cache digital audio content and other information 101.

The computing platform 103 uses a network interface or modem 137 to access servers 100 on the Internet or other computer network 102, in order to download digital audio content or other information 101. The network interface or modem 137, for example, a 3COM Etherlink 10/100 PCI network interface card, may be connected internally or externally to the computing platform 103 using a system bus or peripheral bus 131. The system bus and peripheral buses 131 are provided for connecting internal and external devices to the computing platform 103 in a standard manner. Typical system and peripheral buses 131 include Universal Serial Bus, commonly referred to as USB, IEEE 1394 bus, commonly referred to as FireWire, and Peripheral Connect Interface, commonly referred to as PCI.

The computing platform 103 also supports connection through a user input interface 142 to external or integrated user input devices 153, such as keyboards and mice. In order to provide for output to the user, the computing platform 103 may also contain a display controller 138, for example, an NVIDIA Model No. GeForce2, which stores graphical data such as windows, bitmaps and text. The display controller 138 outputs the graphical data in a video output 150 format that is typically displayed to the user on a video monitor, television 108, or LCD panel. In addition to video output 150, the computing platform 103 can provide audio output 152, which is handled by audio playback hardware 140.

For a computing platform 103 that is acting as a set-top box 107, the computing platform 103 will likely also contain an analog or digital audio and video decoder 139, for example, a C-Cube Model No. AViA 600, hereby incorporated by reference. The analog or digital audio and video decoder 139 decodes the analog or digital audio or video 151 from sources such as cable or satellite, and passes the audio output 152 and video output 150 to an audio and video playback device, such as a television set 108.

For wireless communication with other computing platforms 103, and various digital audio players, such as mobile digital audio players 115, and fixed digital audio players 116 on a wireless network or wireless communication platform 104, the computing platform 103 uses an internal or external wireless network interface or wireless communication interface 141. It should be noted that a computing platform 103 is not limited to the capabilities and features listed in this description, but may contain a subset of the described features or may contain additional capabilities or features not listed.

Gateway Platform

FIG. 9 demonstrates some of the unique capabilities of the stand-alone audio gateway 109, though this example is by no means complete or exhaustive in its coverage of the possible options for a stand-alone audio gateway 109. In particular, the stand-alone audio gateway 109 acts as a fixed function device, whose main purpose is to be an audio gateway. The fixed function nature of the stand-alone audio gateway 109 is unlike the personal computer 105, which exists as a general-purpose computing device. The stand-alone audio gateway 109 is able to connect to the Internet or other computer network 102 using an internal or external network interface or modem 137. The stand-alone audio gateway 109 is able to cache digital audio content and other information 101 downloaded from a server 100 connected to the Internet or other computer network 102 into persistent storage 133, such as a hard drive, on the stand-alone audio gateway 109.

FIG. 9 illustrates a typical system architecture of the stand-alone audio gateway 109. In general, the stand-alone audio gateway 109 has a main processor 130 for executing various software components. The various software components are typically stored in read only memory, or ROM, or flash memory 136, or local storage 132. Local storage 132 can consist of persistent storage 133, such as hard drives or flash memory, or removable storage 134 such as floppy drives, CD-ROM drives, or DVD drives. The software components are executed by the main processor 130 directly from their storage location or are loaded into random access memory or RAM 135, to be executed from RAM 135 by the main processor 130. Local storage 132 can also be used to cache digital audio content and other information 101. The stand-alone audio gateway 109 uses a network interface or modem 137 to access servers 100 on the Internet or other computer network 102, in order to download digital audio content or other information 101. The network interface or modem 137 is connected internally or externally to the stand-alone audio gateway 109 using a system bus or peripheral bus 131. The system bus and peripheral buses 131 are provided for connecting internal and external devices to the stand-alone audio gateway 109 in a standard manner. Typical system and peripheral buses 131 include Universal Serial Bus, commonly referred to as USB, IEEE 1394, commonly referred to as FireWire, and Peripheral Connect Interface, commonly referred to as PCI. The stand-alone audio gateway 109 also supports connection through a user input interface 142 to external or integrated user input devices 153, such as buttons, keyboards and mice. For output to the user, the stand-alone audio gateway 109 may contain a display controller 138, which stores display data such as windows, bitmaps and text. The display controller 138 outputs the display data in a video output 150 format that is typically displayed to the user on a video monitor, television 108, or LCD panel. In addition to video output 150, the stand-alone audio gateway 109 can provide audio output 152, which is handled by audio playback hardware 140. For wireless communication with mobile digital audio players 115, and fixed digital audio players 116 on a wireless network or wireless communication platform 104, the stand-alone audio gateway 109 uses an internal or external wireless network interface or wireless communication interface 141. It should be noted that a stand-alone audio gateway 109 is not limited to the capabilities and features listed in this description, but may contain a subset of the described features or may contain additional capabilities or features not listed.

Mobile Player

Figure 10:
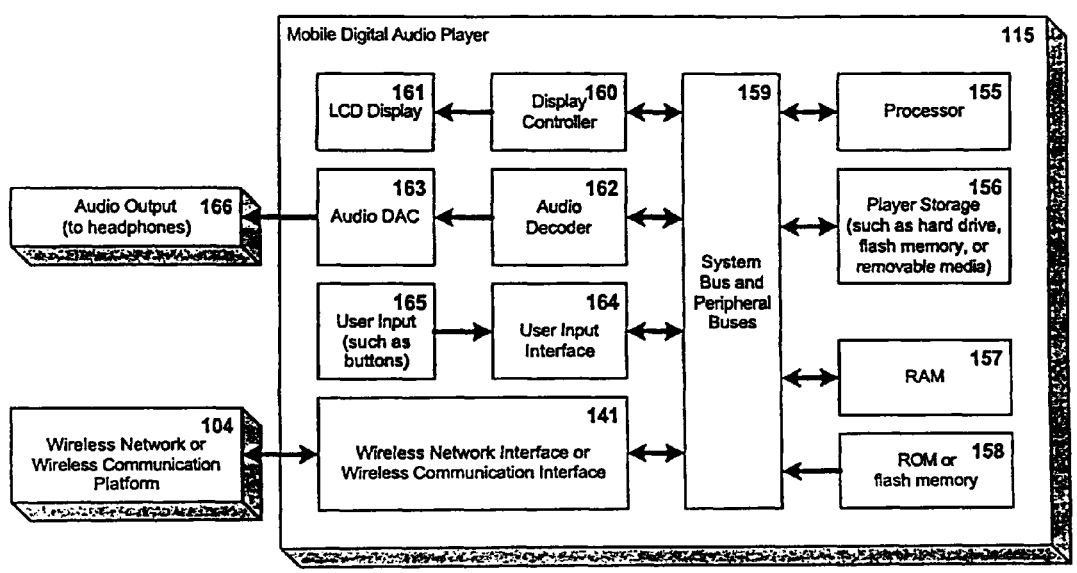
FIG. 10 is a block diagram of a mobile digital audio player in accordance with the present invention.

Many different types of mobile digital audio players 115 are suitable for use with the present invention. FIG. 10 demonstrates the general architecture for a mobile digital audio player 115. In general, a mobile digital audio player 115 has a processor 155 that is responsible for executing various software and firmware components. The various software and firmware components are typically stored in read only memory, or ROM, or flash memory 158 or in player storage 156, such as a hard drive, flash memory, or removable media. The software and firmware components are executed by the processor 155 directly from their storage location or are loaded into random access memory or RAM 157 to be executed from RAM 157 by the processor 155. Player storage 156 can also be used for storing digital audio content and other information 101, such as artists, track names, album names, lyrics, and playlists, for later playback and presentation to the user. Typically, the digital audio content 101 is in some encoded format. The audio decoder 162 decodes the digital audio content 101 and passes it to the audio digital to analog converter 163, or DAC. The audio DAC 163 converts the decoded audio to analog and then provides audio output 166 from the mobile digital audio player 115. The audio output 166 of a mobile digital audio player 115 is typically passed to an amplifier or headphones. Communication using a wireless network or wireless communication platform 104 by the mobile digital audio player 115 with a computer platform 103, other mobile digital audio players 115, and fixed digital audio players 116 is done using an internal or external wireless network interface or wireless communication interface 141. For input from the user, the mobile digital audio player 115 contains user inputs 165, such as buttons or a touch screen. The user input interface 164 handles the actual interface with the user inputs 165, while interpretation of these inputs are typically handled by software and firmware running on the processor 155. For output to the user, the mobile digital audio player 115 may contain a display controller 160, which can provide text and possibly graphical output to the user on an LCD display 161. Tying of the functional components and processor 155 together is typically done using a system bus and peripheral buses 159. Examples of system and peripheral buses 159 include Universal Serial Bus, commonly referred to as USB, IEEE 1394, commonly referred to as FireWire, and Peripheral Connect Interface, commonly referred to as PCI. It should be noted that some of the functional blocks described might encompass multiple physical components. As well, multiple functional blocks may be contained in a single physical component. It should also be noted that a mobile digital audio player 115 is not limited to the capabilities and features listed in this description, but may contain a subset of the described features or may contain additional capabilities or features not listed.

Fixed Player

Figure 11:
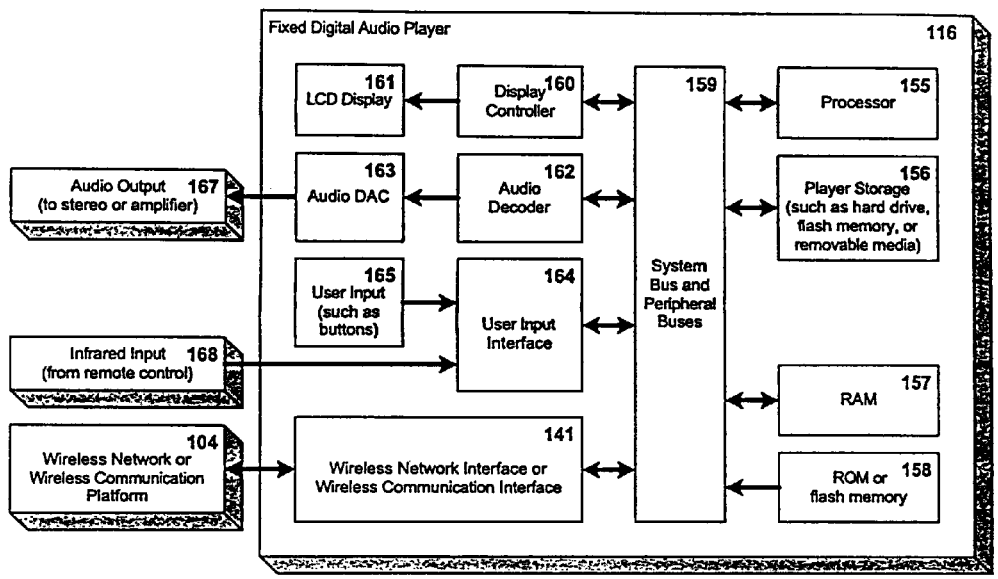
FIG. 11 is a block diagram of a fixed digital audio player in accordance with the present invention.

There are many different types of fixed digital audio players 116. FIG. 11 demonstrates the general architecture for a fixed digital audio player 116. In general, a fixed digital audio player 116 has a processor 155 that is responsible for executing various software and firmware components. The various software and firmware components are typically stored in read only memory, or ROM, or flash memory 158 or in player storage 156, such as a hard drive, flash memory, or removable media. The software and firmware components are executed by the processor 155 directly from their storage location or are loaded into random access memory or RAM 157 to be executed from RAM 157 by the processor 155. Player storage 156 can also be used for storing digital audio content and other information 101, such as artists, track names, album names, lyrics, and playlists, for later playback and presentation to the user. Typically, the digital audio content 101 is in some encoded format. The audio decoder 162 decodes the digital audio content 101 and passes it to the audio digital to analog converter 163, or DAC. The audio DAC 163 converts the decoded audio to analog and then provides audio output 167 from the fixed digital audio player 116. The audio output 167 of a fixed digital audio player 116 is typically passed to a stereo, amplifier, speakers or headphones. Communication using a wireless network or wireless communication platform 104 by the fixed digital audio player 116 with a computing platform 103, mobile digital audio players 115, and other fixed digital audio players 116, is done using an internal or external wireless network interface or wireless communication interface 141. For input from the user, the fixed digital audio player 116 contains user inputs 165, such as buttons or a touch screen. The fixed digital audio player 116 may also receive infrared input 168 from a remote control. The user input interface 164 handles the actual interface with the user inputs 165 and the infrared input 168, while interpretation of these inputs are typically handled by software and firmware running on the processor 155. For output to the user, the fixed digital audio player 116 may contain a display controller 160, which can provide text and possibly graphical output to the user on an LCD display 161. Tying of the functional components and processor 155 together is typically done using a system bus and peripheral buses 159. Examples of system and peripheral buses 159 include Universal Serial Bus, commonly referred to as USB, IEEE 1394, commonly referred to as FireWire, and Peripheral Connect Interface, commonly referred to as PCI. It should be noted that some of the functional blocks described might encompass multiple physical components. As well, multiple functional blocks may be contained in a single physical component. It should also be noted that a fixed digital audio player 116 is not limited to the capabilities and features listed in this description, but may contain a subset of the described features or may contain additional capabilities or features not listed.

Handheld Player

Figure 12:
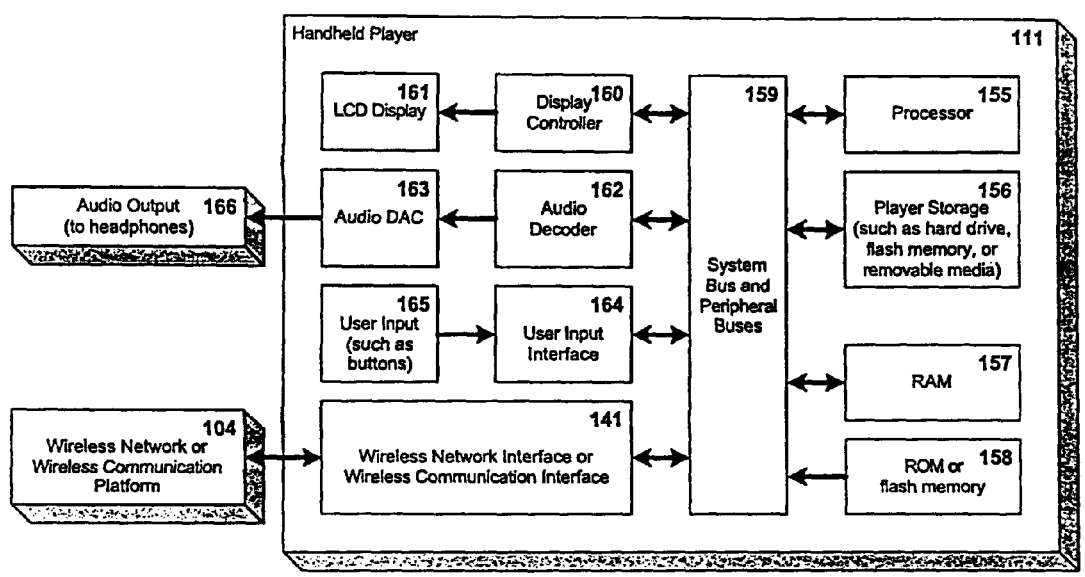
FIG. 12 is a block diagram of a handheld or portable digital audio player in accordance with the present invention.

Many different types of mobile digital audio players 115 are suitable for use with the present invention. For example, FIG. 12 illustrates the general architecture for the handheld player 111. In general, the handheld player 111 includes a processor 155 for executing various software and firmware instructions. The various software and firmware instructions may be stored in read only memory, or ROM, or flash memory 158 or in player storage 156, such as a hard drive, flash memory, or removable media. The software and firmware instructions are executed by the processor 155 directly from their storage location or are loaded into random access memory or RAM 157 to be executed from RAM 157 by the processor 155. Player storage 156 can also be used for storing digital audio content and other information 101, such as artists, track names, album names, lyrics, and playlists, for later playback and presentation to the user. Typically, the digital audio content 101 is in some encoded format. The audio decoder 162, for example, a Texas Instruments digital signal processor, Model No. TMS320VC5416, decodes the digital audio content 101 and passes it to the audio digital to analog converter 163, or DAC. The audio DAC 163, for example, a Texas Instruments Model No. TLC320AD77C converts the decoded audio to analog and then provides audio output 166 from the handheld player 111. The audio output 166 of a handheld player 111 may be used to drive headphones.

Communication using a wireless network or wireless communication platform 104 by the handheld player 111 with the computing platforms 103, other mobile digital audio players 115, and fixed digital audio players 116 is done using an internal or external wireless network interface or wireless communication interface 141. For input from the user, the handheld player 111 contains user inputs 165, such as buttons or a touch screen. The user input interface 164 handles the actual interface with the user inputs 165, while interpretation of these inputs are typically handled by software and firmware running on the processor 155. For output to the user, the handheld player 111 may contain a display controller 160, for example, an embedded display controller in a Motorola MC68EZ328 controller, which can provide text and possibly graphical output to the user on an LCD display 161. Tying of the functional components and processor 155 together is typically done using a system bus and peripheral buses 159. Examples of system and peripheral buses 159 include Universal Serial Bus, commonly referred to as USB, IEEE 1394, commonly referred to as FireWire, and Peripheral Connect Interface, commonly referred to as PCI. It should be noted that some of the functional blocks described might encompass multiple physical components. As well, multiple functional blocks may be contained in a single physical component. It should also be noted that a handheld player 111 is not limited to the capabilities and features listed in this description, but may contain a subset of the described features or may contain additional capabilities or features not listed.

Automotive Player

Figure 13:
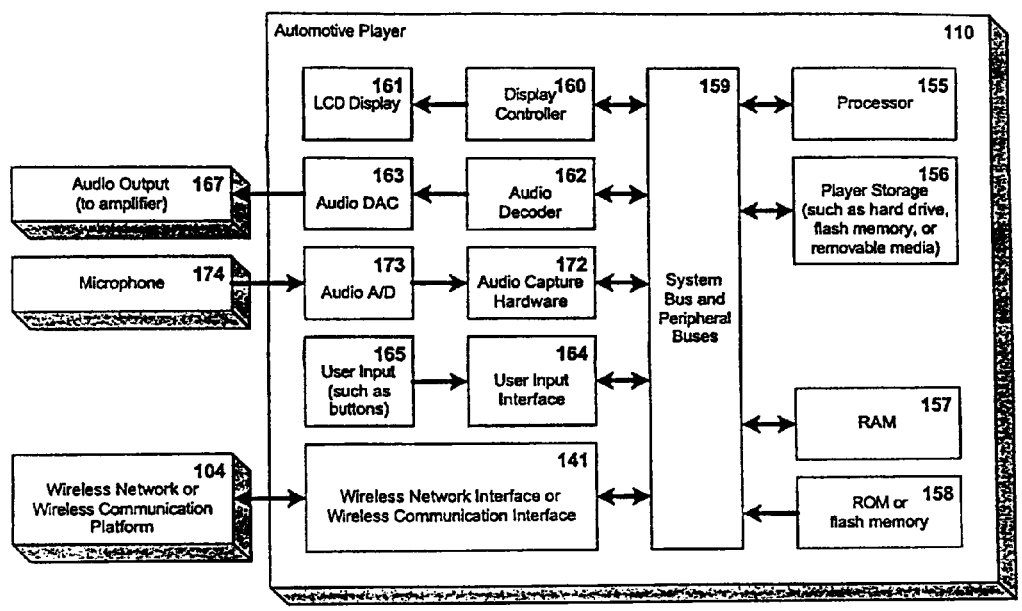
FIG. 13 is a block diagram of an automotive digital audio player in accordance with the present invention.

Another type of mobile digital audio player 115 is the automotive player 110, whose general architecture is shown in FIG. 13. In general, the automotive player 110 includes a processor 155 that is responsible for executing various software and firmware instructions. The various software and firmware components are typically stored in read only memory, or ROM, or flash memory 158 or in player storage 156, such as a hard drive, flash memory, or removable media. The software and firmware instructions are executed by the processor 155 directly from their storage location or are loaded into random access memory or RAM 157 to be executed from RAM 157 by the processor 155. Player storage 156 can also be used for storing digital audio content and other information 101, such as artists, track names, album names, lyrics, and playlists, for later playback and presentation to the user.

Typically, the digital audio content 101 is in some encoded format. The audio decoder 162 decodes the digital audio content 101 and passes it to the audio digital to analog converter 163 or DAC. The audio DAC 163 converts the decoded audio to analog and then provides audio output 167 from the automotive player 110. The audio output 167 of an automotive player 110 typically feeds a conventional audio amplifier, which then drives the car speakers. Communication using a wireless network or wireless communication platform 104 by the automotive player 110 with computing platforms 103, other mobile digital audio players 115, and fixed digital audio players 116 is done using an internal or external wireless network interface or wireless communication interface 141.

For input from the user, the automotive player 110 contains user inputs 165, such as buttons or a touch screen. The user input interface 164 handles the actual interface with the user inputs 165, while interpretation of these inputs are typically handled by software and firmware running on the processor 155. In addition, an automotive player 110 may support voice commands for user input. If voice commands are supported, a microphone 174 is used to feed analog audio to the audio analog to digital converter 173, which converts the analog audio to digital. Then, the audio capture hardware 172 and the processor 155 will interpret the voice commands from the user. For output to the user, the automotive player 110 may contain a display controller 160, which can provide text and possibly graphical output to the user on an LCD display 161. Tying of the functional components and processor 155 together may be accomplished by way of a system bus and peripheral buses 159. Examples of suitable system and peripheral buses 159 include Universal Serial Bus, commonly referred to as USB, IEEE 1394, commonly referred to as FireWire, and Peripheral Connect Interface, commonly referred to as PCI.

It should be noted that some of the functional blocks described might encompass multiple physical components. As well, multiple functional blocks may be contained in a single physical component. It should also be noted that an automotive player 110 is not limited to the capabilities and features listed in this description, but may contain a subset of the described features or may contain additional capabilities or features not listed.

Rack Player

Figure 14:
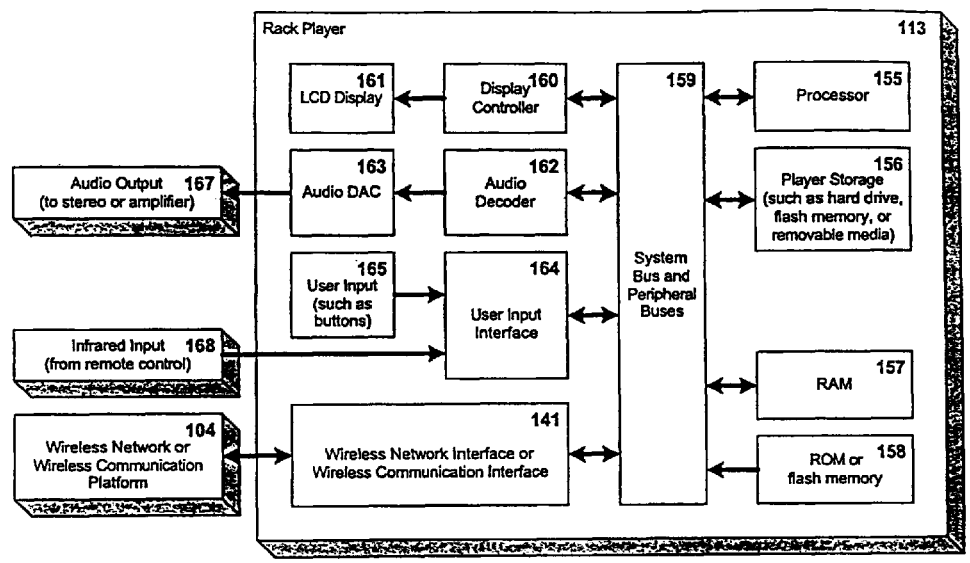
FIG. 14 is a block diagram of a rack player in accordance with the present invention.

There are many different types of fixed digital audio players 116. FIG. 14 demonstrates the general architecture for a rack player 113. In general, a rack player 113 includes a processor 155 that is responsible for executing various software and firmware instructions. The various software and firmware instructions may be stored in read only memory, or ROM, or flash memory 158 or in player storage 156, such as a hard drive, flash memory, or removable media. The software and firmware instructions may be executed by the processor 155 directly from their storage location or loaded into random access memory or RAM 157 to be executed from RAM 157 by the processor 155. Player storage 156 can also be used for storing digital audio content and other information 101, such as artists, track names, album names, lyrics, and playlists, for later playback and presentation to the user. Typically, the digital audio content 101 is in some encoded format. The audio decoder 162 decodes the digital audio content 101 and passes it to the audio digital to analog converter 163, or DAC. The audio DAC 163 converts the decoded audio to analog and then provides audio output 167 from the rack player 113. The audio output 167 of a rack player 113 typically is passed to a stereo system 114. Communication using a wireless network or wireless communication platform 104 by the rack player 113 with computing platforms 103, mobile digital audio players 115, and other fixed digital audio players 116 is done using an internal or external wireless network interface or wireless communication interface 141. For input from the user, the rack player 113 contains user inputs 165, such as buttons or a touch screen. The rack player 113 may also receive infrared input 168 from a remote control. The user input interface 164 handles the actual interface with the user inputs 165 and the infrared input 168, while interpretation of these inputs are typically handled by software and firmware running on the processor 155. For output to the user, the rack player 113 may contain a display controller 160, which can provide text and possibly graphical output to the user on an LCD display 161. Tying connection of the functional components and processor 155 together may be accomplished by way of a system bus and peripheral buses 159. Examples of suitable system and peripheral buses 159 include Universal Serial Bus, commonly referred to as USB, IEEE 1394, commonly referred to as FireWire, and Peripheral Connect Interface, commonly referred to as PCI.

It should be noted that some of the functional blocks described might encompass multiple physical components. As well, multiple functional blocks may be contained in a single physical component. It should also be noted that a rack player 113 is not limited to the capabilities and features listed in this description, but may contain a subset of the described features or may contain additional capabilities or features not listed.

Stand-Alone Player

Figure 15:
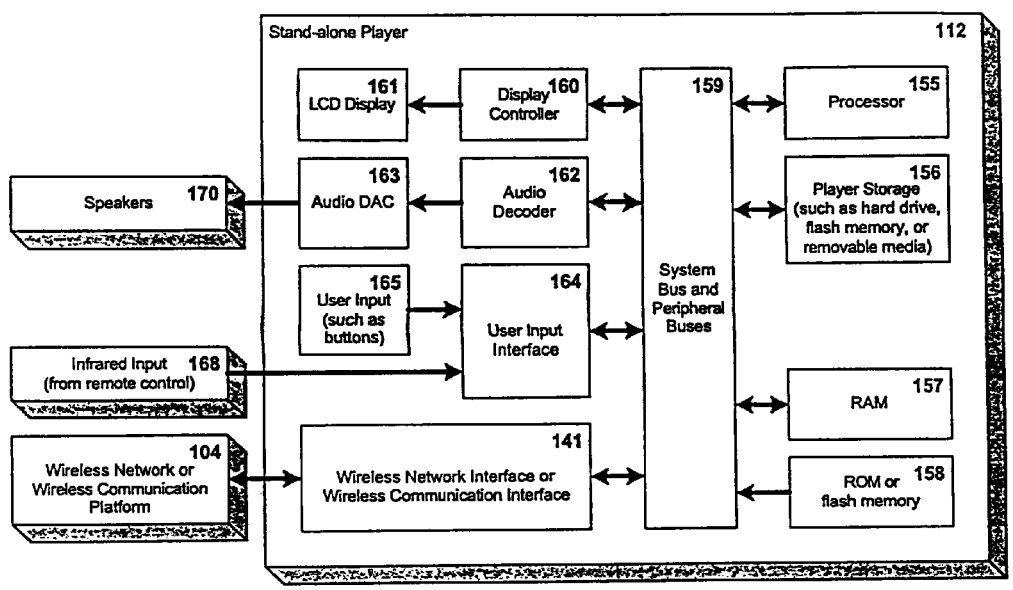
FIG. 15 is a block diagram of a stand-alone digital audio player in accordance with the present invention.

Another type of fixed digital audio player 116 is the stand-alone player 112, whose general architecture is shown in FIG. 15. In general, a stand-alone player 112 includes a processor 155 that is responsible for executing various software and firmware instructions. The various software and firmware components are typically stored in read only memory, or ROM, or flash memory 158 or in player storage 156, such as a hard drive, flash memory, or removable media. The software and firmware components are executed by the processor 155 directly from their storage location or are loaded into random access memory or RAM 157 to be executed from RAM 157 by the processor 155. Player storage 156 can also be used for storing digital audio content and other information 101, such as artists, track names, album names, lyrics, and playlists, for later playback and presentation to the user. Typically, the digital audio content 101 is in some encoded format. The audio decoder 162 decodes the digital audio content 101 and passes it to the audio digital to analog converter 163, or DAC. The audio DAC 163 converts the decoded audio to analog. The analog audio from a stand-alone player 112 typically directly drives speakers 170 attached to the stand-alone player 112. Communication using a wireless network or wireless communication platform 104 by the stand-alone player 112 with computing platforms 103, mobile digital audio players 115, and other fixed digital audio players 116 is done using an internal or external wireless network interface or wireless communication interface 141. For input from the user, the stand-alone player 112 contains user inputs 165, such as buttons or a touch screen. The stand-alone player 112 may also receive infrared input 168 from a remote control. The user input interface 164 handles the actual interface with the user inputs 165 and the infrared input 168, while interpretation of these inputs are typically handled by software and firmware running on the processor 155. For output to the user, the stand-alone player 112 may contain a display controller 160, which can provide text and possibly graphical output to the user on an LCD display 161. Connection of the functional components and processor 155 together is typically done using a system bus and peripheral buses 159. Examples of suitable system and peripheral buses 159 include Universal Serial Bus, commonly referred to as USB, IEEE 1394, commonly referred to as FireWire, and Peripheral Connect Interface, commonly referred to as PCI.

It should be noted that some of the functional blocks described might encompass multiple physical components. As well, multiple functional blocks may be contained in a single physical component. It should also be noted that a stand-alone player 112 is not limited to the capabilities and features listed in this description, but may contain a subset of the described features or may contain additional capabilities or features not listed.

Audio Gateway Software

FIGS. 16 to 20 provide flow diagrams for the audio gateway embodiment of this invention. In these flow diagrams, the software is assumed to be running in a multitasking environment, with each of the flow diagrams representing a particular independently running task or process. However, it should be noted that these flow diagrams represent only one of many different ways to implement the key software functionality for the audio gateway and that many other implementations are possible, including those which do not require a multitasking environment.

Audio Gateway Message Handling Flow

Figure 16:
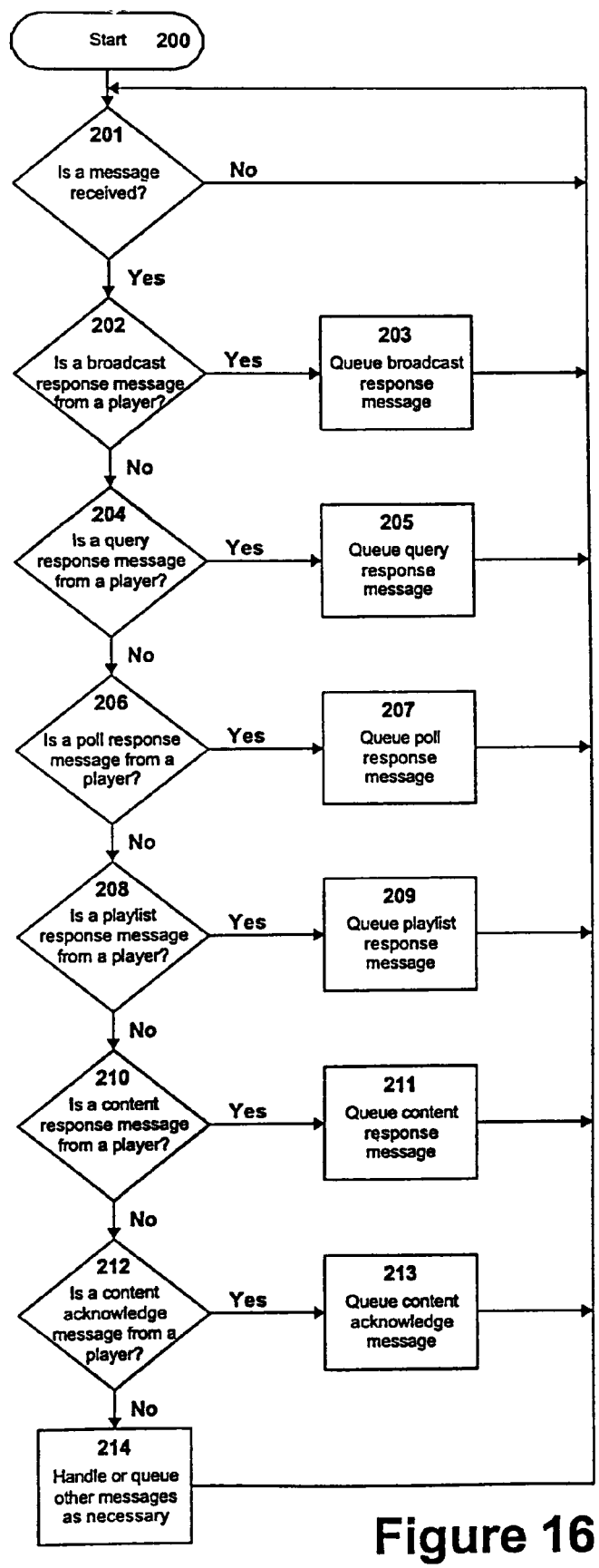
FIG. 16 is a flow diagram of the audio gateway message handling in accordance with the present invention.

FIG. 16 provides the flow diagram of the message handler for the audio gateway. In general, the message handler takes the messages received from other computing platforms 103, mobile digital audio players 115, and fixed digital audio players 116 on the wireless network or wireless communication platform 104 and queues these messages for use by other processes or handles them itself, depending on the message type. In this embodiment, the message handler is a continuously running process. The step, "Start" 200, represents the beginning of the message handling process. The message handler checks if there is a message received in step 201.

If a message has been received, the message handler then checks to see what type of message it is, among many possible types, as indicated in steps 202-212. After the message handler determines the type of message, an appropriate response is queued and the system returns to step 201 and checks for additional messages. If the message is a broadcast response message from a player 202, then the message handler queues the broadcast response message 203. If the message is a query response message from a player 204, then the message handler queues the query response message in step 205. If the message is a poll response message from a player 206, then the message handler queues the poll response message in step 207. If the message is a playlist response message from a player 208, then the message handler queues the playlist response message in step 209. If the message is a content response message from a player 210, then the message handler queues the content response message in step 211. If the message is a content acknowledge message from a player 212, then the message handler queues the content acknowledge message in step 213. If the message was none of those previously checked for, the message handler handles or queues any other messages as necessary 214.

Audio Gateway Discovery Flow

Figure 17:
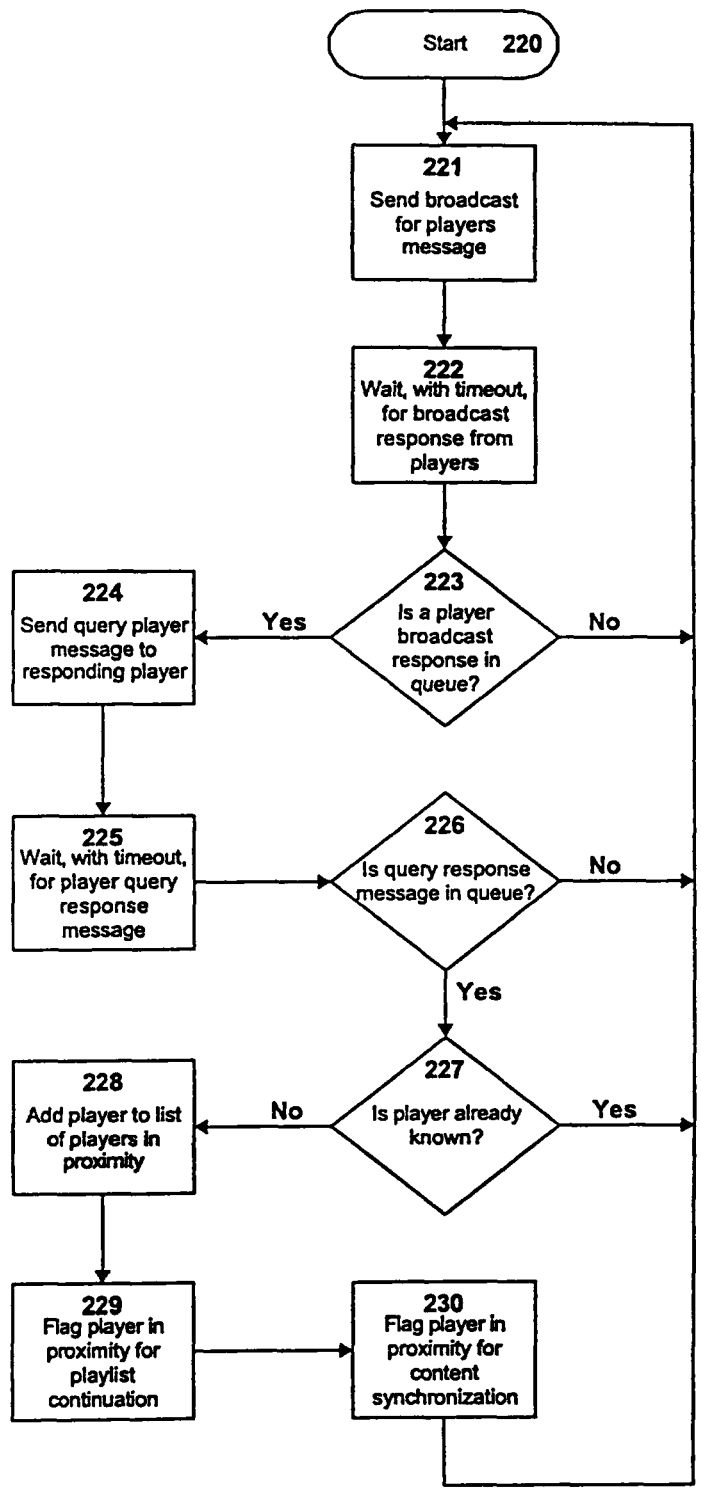
FIG. 17 is a flow diagram of the audio gateway discovery in accordance with the present invention.

Discovery of mobile digital audio players 115 and fixed digital audio players 116 within range of the audio gateway, on the wireless network or wireless communication platform 104, is an important capability with respect to this invention. FIG. 17 provides the flow diagram for discovery by the audio gateway of mobile digital audio players 115 and fixed digital audio players 116. In this example, the audio gateway discovery handler is a continuously running process. The step "Start" 220, represents the beginning of the discovery handling process. In order to get a message response from the mobile digital audio players 115 and fixed digital audio players 116, the discovery handler sends a broadcast for players message in step 221. The discovery handler then waits, with a timeout, for example, 5 seconds, for a broadcast response message from any players in step 222. The discovery handler then checks if there is a player broadcast response message in the queue in step 223. If there is no response, then the discovery handler broadcasts again for players. If there is a response, then the discovery handler sends a query player message to a responding player in step 224 to get information about the type of player that has responded. The discovery handler then waits, with some timeout, for a player query response message in step 225 from the player that previously responded to the broadcast. The discovery handler then checks if there is a query response message in the queue in step 226. If there is no response, then the discovery handler broadcasts again for players. If there is a response, then the discovery handler checks the information returned in the query response message to see if the player is already known in step 227. If the player is already known, then the discovery handler broadcasts again for players. However, a player is unlikely to respond to a broadcast from an audio gateway when the player and audio gateway already know about each other. If the player is not already known, then the discovery handler adds the player to the list of players in proximity in step 228 of the audio gateway. Finally, the discovery handler flags the new player in proximity for playlist continuation in step 229 and for content synchronization in step 230. This allows the playlist continuation handler in the audio gateway to capture the current playlist and current selection from this new player for possible broadcast to other players. Also, this allows the content synchronization handler in the audio gateway to automatically download digital audio content and other information 101 cached on the audio gateway to the new player.

Audio Gateway Dropout Detection Flow

Figure 18:
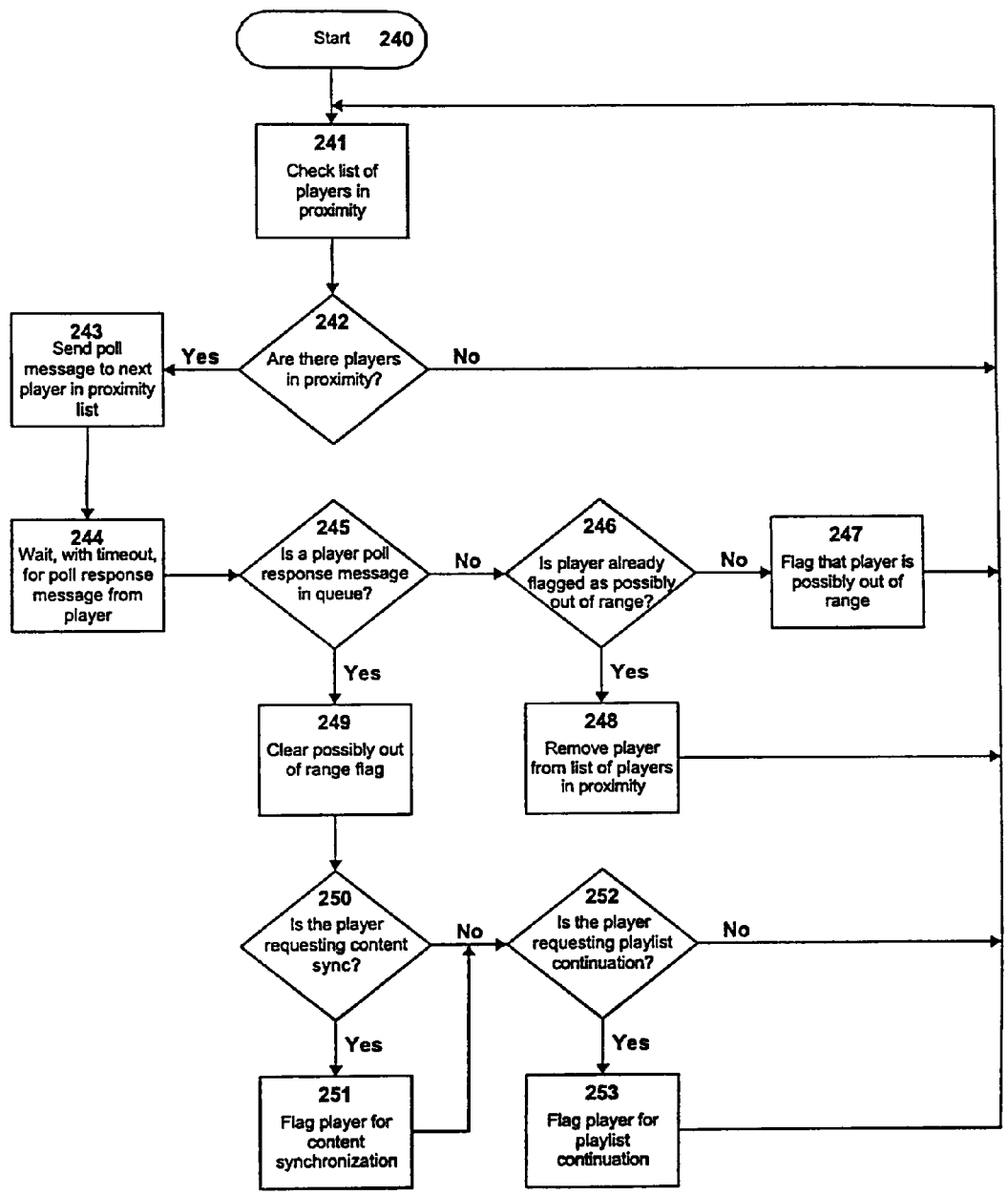
FIG. 18 is a flow diagram of the audio gateway drop-out detection in accordance with the present invention.

The flow diagram for audio gateway detection of dropout of players is shown in FIG. 18. The dropout detection handler in the audio gateway polls players that are known to be in proximity in order to see if any of the players has possibly gone out of range of the wireless network or wireless communication platform 104 or has been turned off. In this example, the dropout detection handler is a continuously running process. The step, "Start" 240, represents the beginning of the dropout detection handling process. The dropout detection handler checks the list of players in proximity 241 maintained by the audio gateway. If there are players in proximity as determined in step 242, then the dropout detection handler sends a poll message to the next player in proximity in the proximity list in step 243. This allows all the players in the list of players in proximity to be checked in a sequential manner. Then the dropout detection handler waits, with some timeout, for a poll response message from the player in step 244 that was sent the poll message in step 243. If there is no poll response message from the player in the queue in step 245 then the dropout detection handler checks if the player is already flagged as possibly being out of range in step 246 of the wireless network or wireless communication platform 104. If the player is not already flagged as possibly out of range 246, then the dropout detection handler flags that the player is possibly out of range in step 247 and checks the list of players in proximity again. If the player is already flagged as possibly out of range in step 246, then the dropout detection handler removes the player from the list of players in proximity in step 248 and checks the list of players in proximity in step 241 again. If the player poll response message is in the queue in step 245, then the dropout detection handler clears the possibly out of range flag in step 249 for the player in the list of players in proximity. Next, the dropout detection handler checks if the player is requesting content synchronization in step 250, based on information passed in the poll response message from the player. If the player is requesting content synchronization, then the dropout detection handler flags the player for content synchronization in step 251 in the list of players in proximity. The content synchronization handler uses this information when deciding which players to update for digital audio content and other information 101. Once the player is flagged for content synchronization or the player is not requesting content synchronization, then the dropout detection handler checks if the player is requesting playlist continuation in step 252, based on information passed in the poll response message from the player. If the player is requesting playlist continuation, then the dropout detection handler flags the player for playlist continuation in step 253 in the list of players in proximity. The playlist continuation handler uses this information when deciding which players to update the playlist and current selection for. Once the player is flagged for playlist continuation in step 253 or the player is not requesting playlist continuation in step 252, then the dropout detection handler checks the list of players in proximity in step 241 again.

Audio Gateway Content Synchronization Flow

Figure 19:
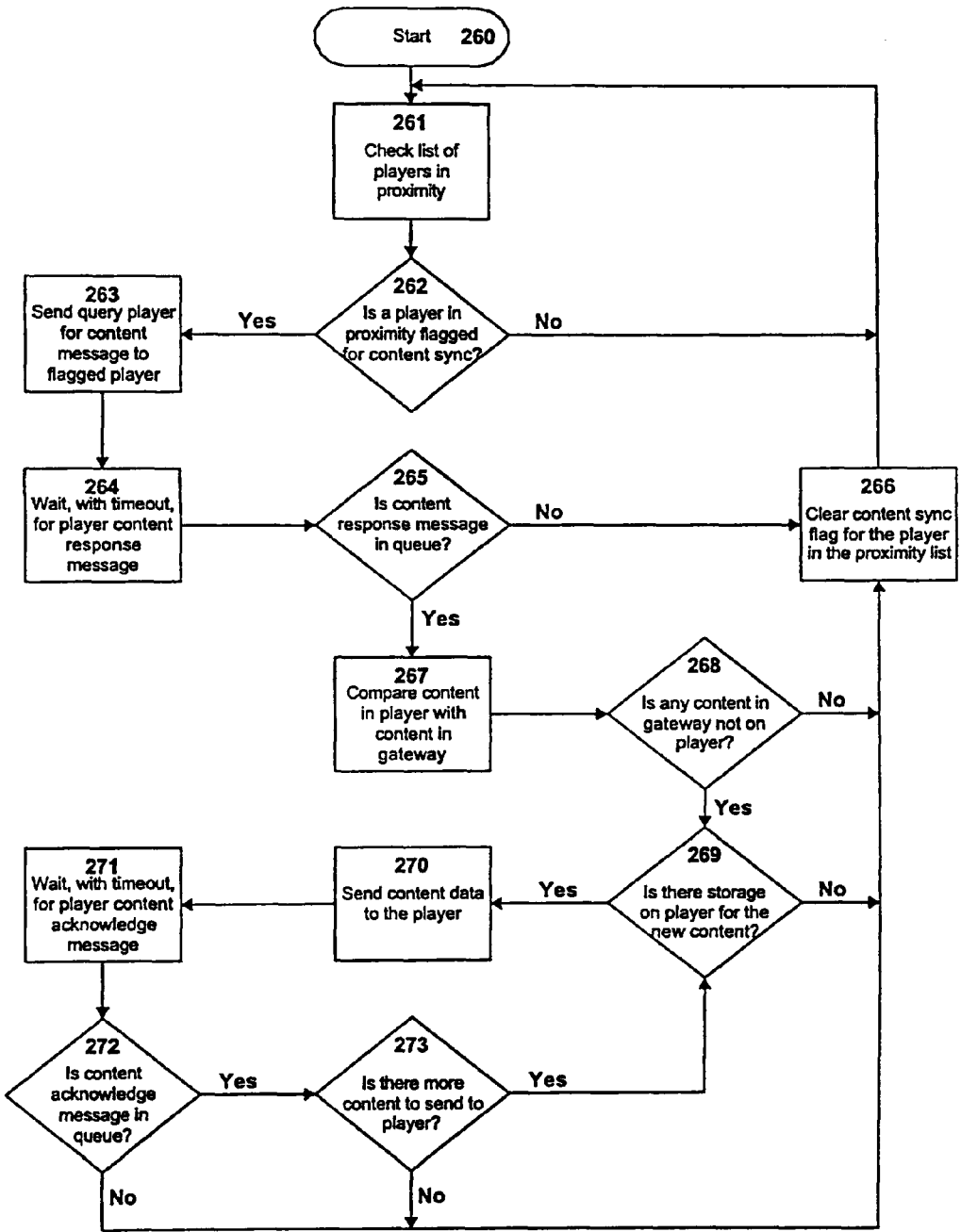
FIG. 19 is a flow diagram of the audio gateway content synchronization in accordance with the present invention.

The flow diagram for audio gateway content synchronization is shown in FIG. 19, with content synchronization being a key capability of the invention. The content synchronization handler in the audio gateway checks for players that need content synchronization. Content synchronization involves updating or adding digital audio content and other information 101 to a player when the audio gateway has digital audio content and other information 101 that is not contained on the player. This may be handled automatically when the player has recently been discovered as being in proximity by the gateway discovery handler or the player directly requests content synchronization through poll response messages to the gateway. In this example, the content synchronization handler is a continuously running process. The step, "Start" 260, represents the beginning of the content synchronization handling process. The content synchronization handler checks the list of players in proximity in step 261 maintained by the gateway. If there are players in proximity flagged for content synchronization in step 262, then the content synchronization handler sends a query player for content message to the player in step 263 that is flagged for content synchronization. Next, the content synchronization handler waits, with some timeout, for a player content response message in step 264. If there is no content response message in the queue in step 265 from the player that was sent the query player for content message in step 263, then the content synchronization handler clears the content synchronization flag for the player in the proximity list in step 266 and checks the list of players in proximity again. If there is a content response message in the queue in step 265 from the player that was sent the query player for content message, then the gateway compares the digital audio content in the player with the digital audio content in the gateway in step 267. The player's digital audio content information is contained in the content response message sent to the gateway by the player. Next, the content synchronization handler checks if there is any content in the gateway that is not on the player in step 268. If the player content is properly synchronized with the gateway, then the content synchronization handler clears the content synchronization flag for the player in the proximity list and checks the list of players in proximity in step 261 again. If there is content on the gateway that is not on the player in step 268, then the content synchronization handler checks if there is storage on the player for the new content in step 269. The available storage on the player is provided in the content response message that the player sent to the gateway. If there is not sufficient storage on the player for the new content in step 269, then the content synchronization handler clears the content synchronization flag for the player in the proximity list in step 266 and checks the list of players in proximity in step 261 again. If there is storage on the player for the new content as determined in step 269, then the content synchronization handler sends the content data to the player in step 270. Next, the content synchronization handler waits, with some timeout, for the content acknowledge message from the player in step 271. If there is no content acknowledge message in the queue in step 272, then the content synchronization handler clears the content synchronization flag for the player in the proximity list in step 266 and checks the list of players in proximity in step 261 again. If there is a content acknowledge message in the queue from the player, then the content synchronization handler checks to see, from the compare of content in the player with content in the gateway, if there is more content to send to the player in step 273. If there is more content to send to the player then the content synchronization handler checks again if there is storage on the player for the new content in step 269, and so on until there is no more content to pass from the gateway to the player. If there is no more content to send to the player, then the content synchronization handler clears the content synchronization flag for the player in the proximity list in step 266 and checks the list of players in proximity in step 261 again.

Audio Gateway Playlist Continuation Flow

Figure 20:
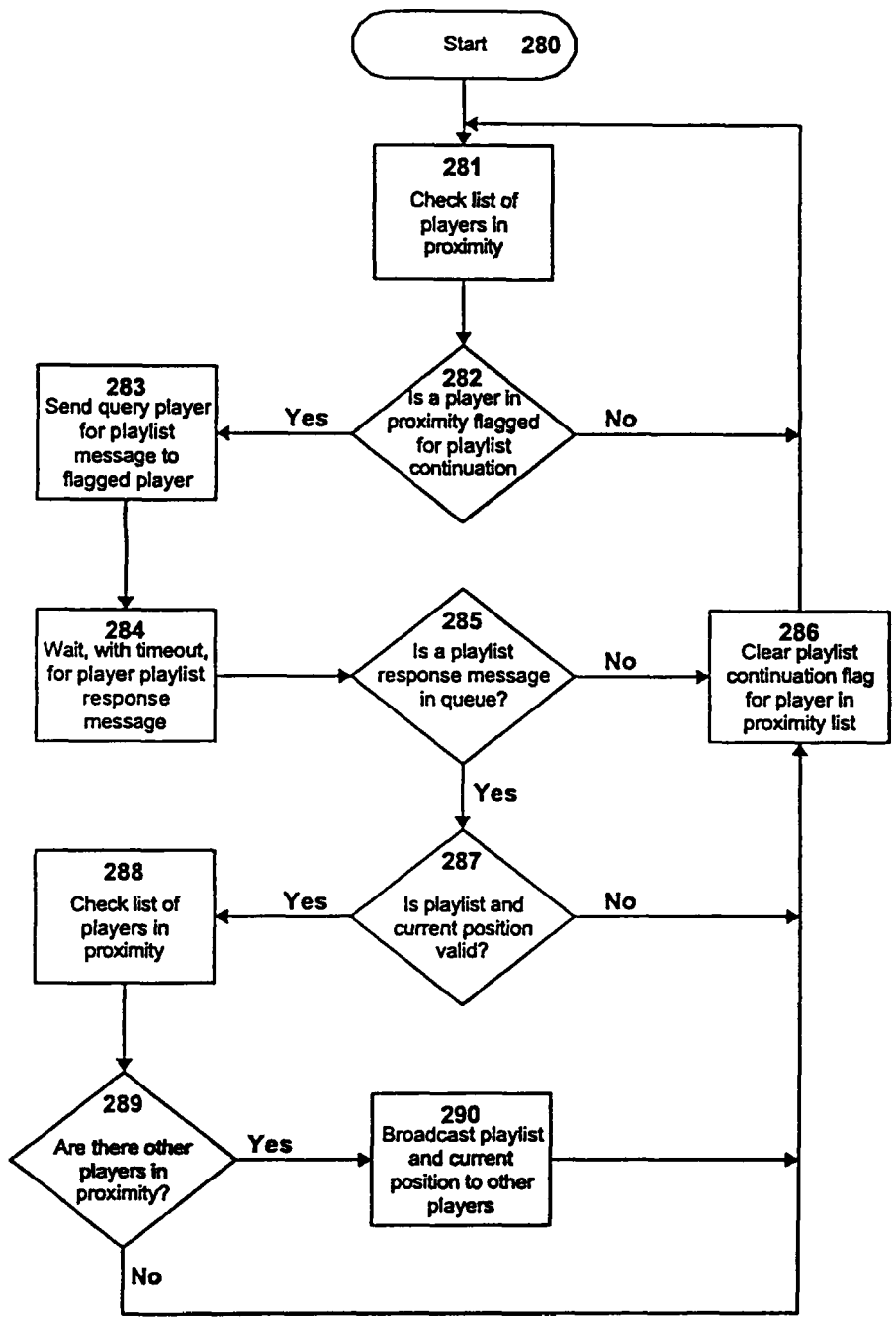
FIG. 20 is a flow diagram of the audio gateway playlist continuation in accordance with the present invention.

The flow diagram for audio gateway playlist continuation is shown in FIG. 20, with playlist continuation being a key capability of the invention. The playlist continuation handler in the audio gateway checks for propagation of the playlist and current playlist selection from one mobile digital audio player 115 or fixed digital audio player 116 to all other mobile digital audio players 115 and fixed digital audio players 116 in proximity. Playlist continuation involves seamless continuation of playback of digital audio content 101 from a particular playlist as a user moves from one mobile digital audio player 115 or fixed digital audio player 116 to another. This may be handled automatically when the gateway discovery handler discovers a player as being in proximity, where the player is currently playing digital audio content 101. The player itself may also directly request playlist continuation through poll response messages to the gateway.

In this example, the playlist continuation handler is a continuously running process. The step, "Start" 280, represents the beginning of the playlist continuation handling process. The playlist continuation handler checks the list of players in proximity in step 281 maintained by the gateway. If there are players in proximity flagged for playlist continuation in step 282, then the playlist continuation handler sends a query player for playlist message to the player in step 283 that is flagged for playlist continuation. Next, the playlist continuation handler waits, with some timeout, for a player playlist response message in step 284. If there is no playlist response message in the queue in step 285 from the player that was sent the query player for playlist message in step 283, then the playlist continuation handler clears the playlist continuation flag for the player in the proximity list in step 286 and checks the list of players in proximity again. If there is a playlist response message in the queue as determined in step 285 from the player that was sent the query player for playlist message in step 283, then the gateway checks the playlist response message to see if the playlist and current position within the playlist, both of which are contained in the playlist response message, are valid in step 287. If the playlist and current position are not valid, then the playlist continuation handler clears the playlist continuation flag for the player in the proximity list in step 286 and checks the list of players in proximity again. If the playlist and current position in the playlist are valid as determined in step 287, then the playlist continuation handler checks the list of players in proximity in step 288. If there are any other players in proximity as determined in step 289, then the playlist continuation handler sends a broadcast playlist and current position message to all other players in proximity in step 290. After the playlist continuation handler sends a broadcast playlist and current position message to all other players in proximity in step 290 or if there are no other players in proximity, then the playlist continuation handler clears the playlist continuation flag for the player in the proximity list in step 286 and checks the list of players in proximity in step 281 again.

Player Software

FIGS. 21-27 provide flow diagrams for the various digital audio players. In these flow diagrams, the software is assumed to be running in a multitasking environment, with each of the flow diagrams representing a particular independently running task or process. However, it should be noted that these flow diagrams represent only one of many different ways to implement the key software functionality for the player and that many other implementations are possible, including those which do not require a multitasking environment.

Player Message Handling Flow

Figure 21:
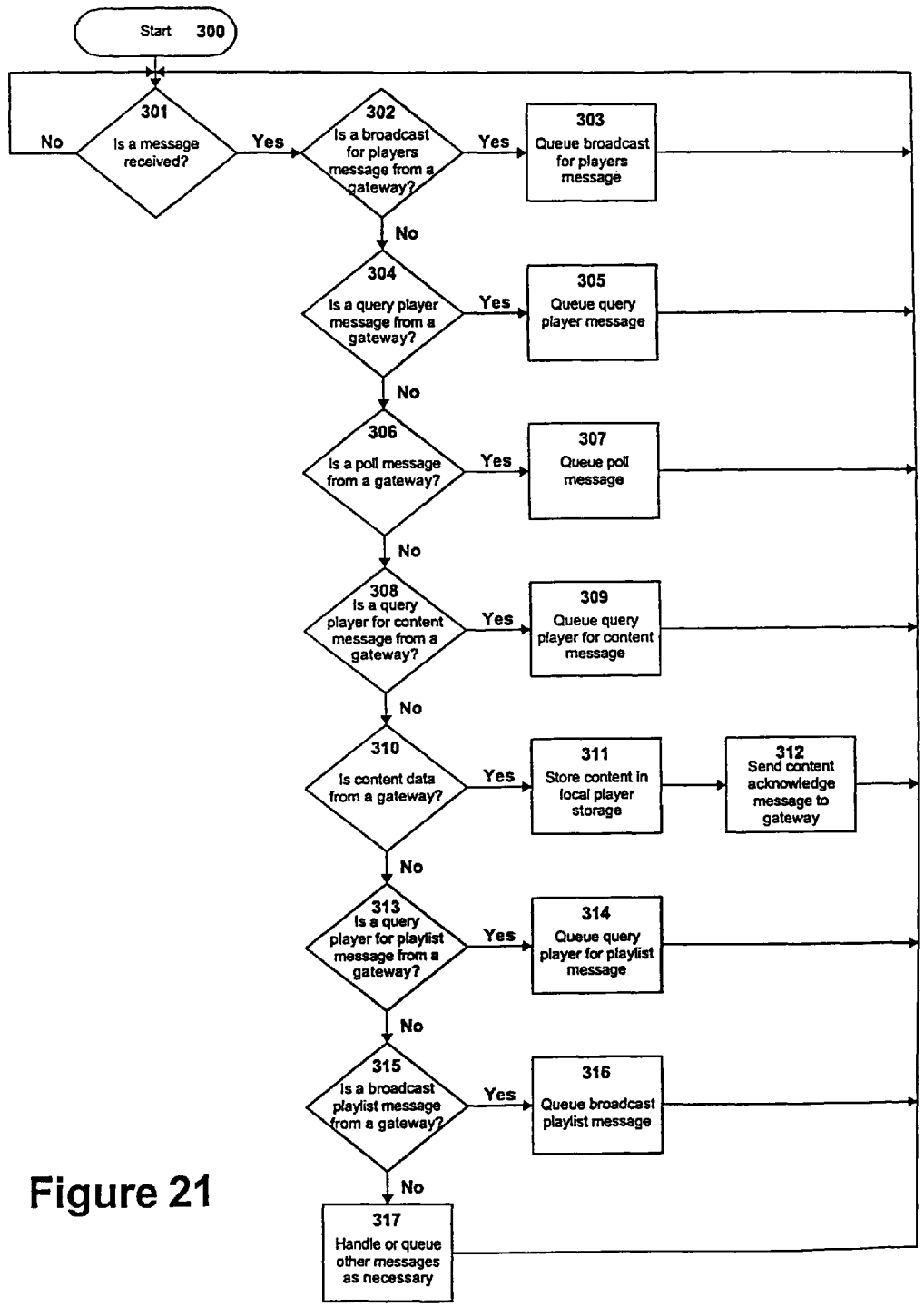
FIG. 21 is a flow diagram of the player message handling in accordance with the present invention.

FIG. 21 is a flow diagram of the message handler for a player. In general, the message handler takes the messages received from computing platforms 103 acting as audio gateways and from other mobile digital audio players 115 and fixed digital audio players 116, on a wireless network or wireless communication platform 104, and queues these messages for use by other processes or handles them itself, depending on the message type. In this example, the message handler is a continuously running process. The step, "Start" 300, represents the beginning of the message handling process. The message handler checks if there is a message received in step 301. If there is a message received, the message handler then checks to see what type of message it is, among many possible types.

After the message handler determines the type of message an appropriate response is queued and the system returns to step 301 and checks for additional messages. If the message is a broadcast for players message from a gateway as determined in step 302, then the message handler queues the broadcast for players message in step 303. After the message handler queues the broadcast for players message in step 303, the message handler checks for more messages. If the message is a query player message from a gateway as determined in step 304, then the message handler queues the query player message in step 305. After the message handler queues the query player message in step 305, the message handler checks for more messages. If the message is a poll message from a gateway as determined in 306, then the message handler queues the poll message in step 307. After the message handler queues the poll message in step 307, the message handler checks for more messages. If the message is a query player for content message from a gateway as determined in 308, then the message handler queues the query player for content message in step 309. After the message handler queues the query player for content message in step 309, the message handler checks for more messages. If the message is content data from a gateway in step 310, then the message handler stores the content in local player storage in step 311. The message handler also sends a content acknowledge message to the gateway in step 312. After the message handler sends a content acknowledge message to the gateway in step 312, the message handler checks for more messages. If the message is a query player for playlist message from a gateway as determined in step 313, then the message handler queues the query player for playlist message in step 314. After the message handler queues the query player for playlist message in step 314, the message handler checks for more messages. If the message is a broadcast playlist message from a gateway as determined in step 315, then the message handler queues the broadcast playlist message in step 316. After the message handler queues the broadcast playlist message in step 316, the message handler checks for more messages. Finally, if the message was none of those previously checked for, the message handler handles or queues any other messages as necessary in step 317 and then the message handler checks for more messages.

Player Discovery Flow

Figure 22:
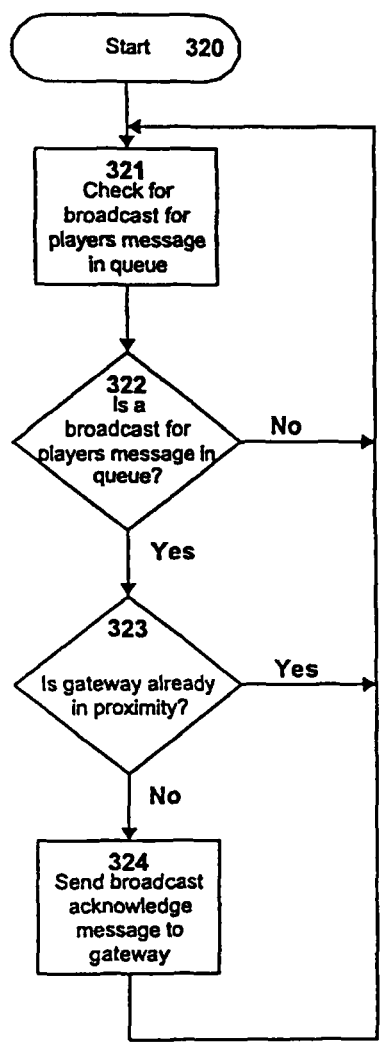
FIGS. 22 and 23 are flow diagrams of the player discovery in accordance with the present invention.
Figure 23:
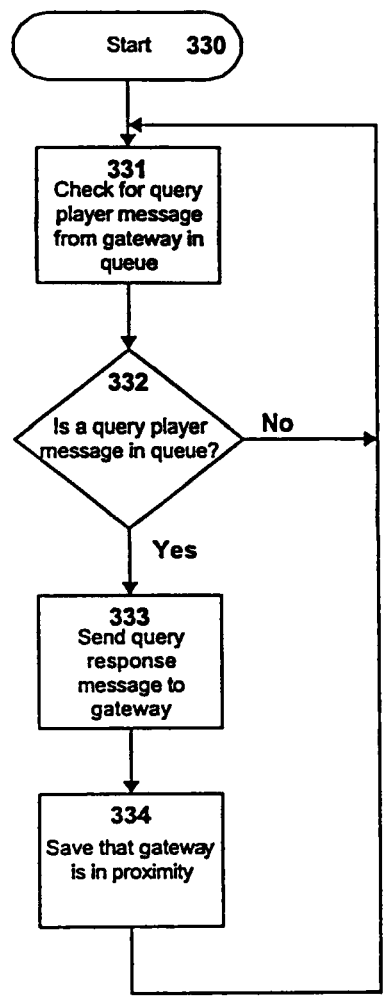

Discovery by the audio gateway of mobile digital audio players 115 and fixed digital audio players 116 is an important capability with respect to this invention. FIGS. 22 and 23 provide the flow diagrams for discovery responses by the player when the player detects discovery attempts by an audio gateway. In this example, the player discovery broadcast response handler and the player discovery query response handler are continuously running processes. The step, "Start" 320, represents the beginning of the discovery broadcast response handling process. The discovery broadcast response handler first checks for a broadcast for players message in the queue in step 321 from a gateway. If there is a broadcast for players message in the queue as determined in step 322, then the discovery broadcast response handler checks if the gateway is already in proximity of the player in step 323. The discovery broadcast response handler is able to get information about the gateway from the broadcast for players message received from the gateway and can compare that information with information saved by the discovery query response handler for any gateway in proximity. If the gateway is not already in proximity as determined in step 323, then the discovery broadcast response handler sends a broadcast acknowledge message to the gateway in step 324. After the discovery broadcast response handler sends the broadcast acknowledge message to the gateway in step 324, or if the gateway is already in proximity as determined in step 323, or if there is no broadcast for players message in the queue as determined in step 322, then the discovery broadcast response handler checks for a broadcast for players message in the queue again.

The step, "Start" 330 (FIG. 23), represents the beginning of the discovery query response handling process. The discovery query response handler first checks for query player messages from a gateway in the queue in step 331. If there is a query player message in the queue as determined in step 332, then the discovery query response handler sends a query response message to the gateway in step 333 that sent the query player message. Then the discovery query response handler saves that the gateway is in proximity in step 334 from information obtained from the query player message from the gateway. After the discovery query response handler saves that the gateway is in proximity as determined in step 334 or if there is no query player message in the queue as determined in step 332, then the discovery query response handler checks for a query player message from a gateway in the queue again.

Player Dropout Detection Flow

Figure 24:
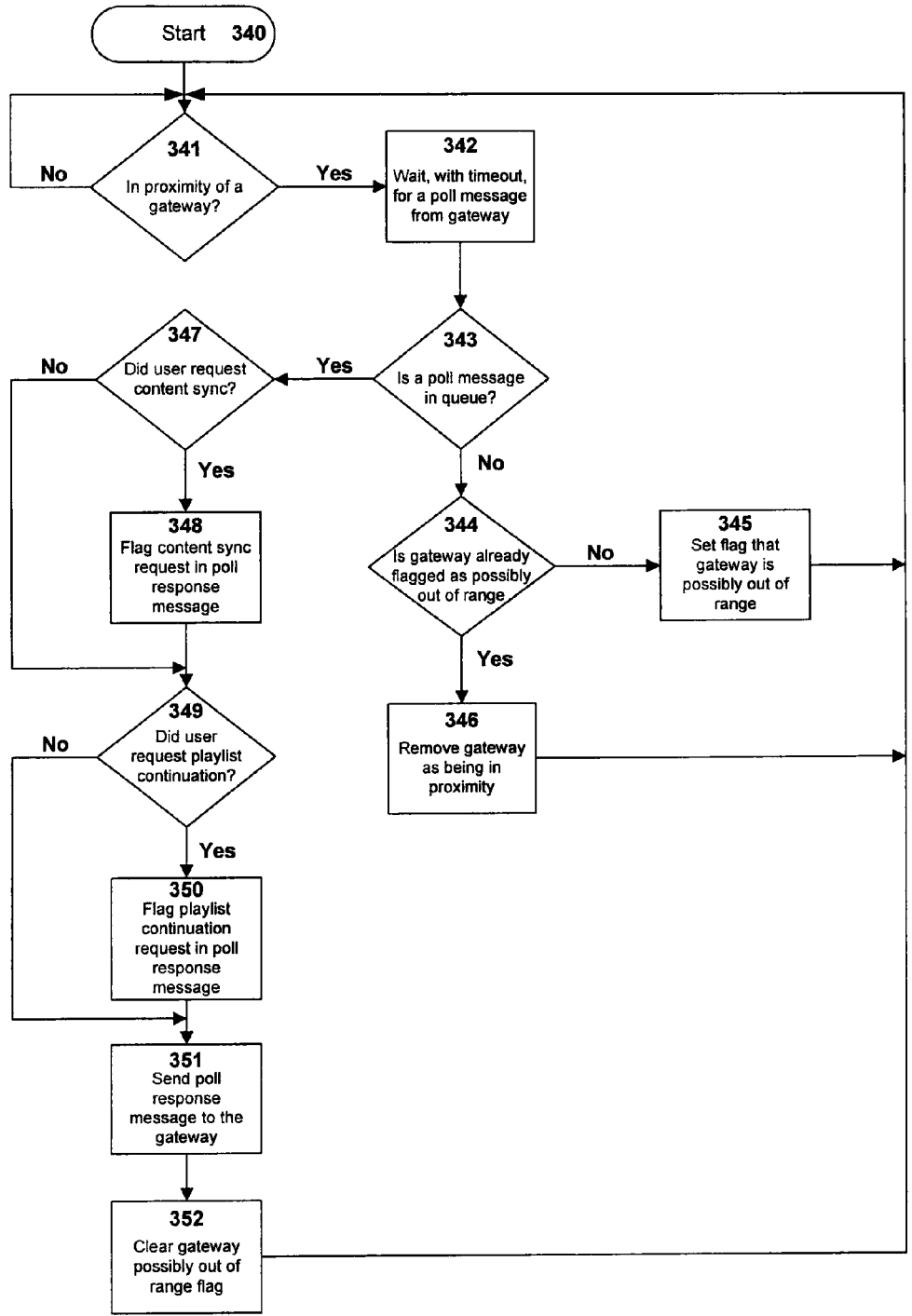
FIG. 24 is a flow diagram of the player drop-out detection in accordance with the present invention.

The flow diagram for player dropout detection of an audio gateway is shown in FIG. 24. The dropout detection handler in the player watches for poll messages from an audio gateway in order to see if the player has gone out of range of the gateway. In this example, the player dropout detection handler is a continuously running process. Step, "Start" 340, represents the beginning of the player dropout detection handling process. The player dropout detection handler checks if the player is in proximity of a gateway in step 341. The player discovery query response handler, shown in FIG. 23, saves information about a gateway that is in proximity. If the player is not in proximity of a gateway as determined in step 341, then the player dropout detection handler just continues to check if the player is in proximity of a gateway. If the player is in proximity of a gateway as determined in step 341, then the player dropout detection handler waits, with some timeout, for a poll response message from the gateway in step 342 that is in proximity. The timeout period is significantly more than the polling period used by the gateway. If there is not a poll message in the queue as determined in step 343 from the gateway that is in proximity, then the player dropout detection handler checks if the gateway is already flagged as possibly out of range in step 344. If the gateway is not already flagged as possibly out of range as determined in step 344, then the player dropout detection handler flags that the gateway is possibly out of range in step 345 and then continues to check if the player is in proximity of a gateway in step 341. If the gateway is already flagged as possibly out of range as determined in step 344, then the player dropout detection handler removes the gateway as being in proximity in step 346 and then continues to check if the player is in proximity of a gateway in step 341. If there is a poll message in the queue as determined in 343 from the gateway that is in proximity, then the player dropout detection handler checks if the user requested content synchronization of the player in step 347. If the user did request content synchronization of the player as determined in step 347, then the player dropout detection handler flags a content synchronization request in the poll response message in step 348 to the gateway in proximity. If the user did not request content synchronization of the player, then the player dropout detection handler skips flagging of content synchronization in the poll response message in step 348. Next, the player dropout detection handler checks if the user requested playlist continuation for the player in step 349. If the user did request playlist continuation for the player as determined in step 349, then the player dropout detection handler flags a playlist continuation request in the poll response message in step 350 to the gateway in proximity. If the user did not request playlist continuation for the player as determined in step 349, then the player dropout detection handler skips flagging of playlist continuation in the poll response message in step 350. Next, the player dropout detection handler sends the poll response message to the gateway in step 351 that is in proximity and sent the poll message. Next, the player dropout detection handler clears the gateway possibly out of range flag in step 352 if it was set for the gateway in proximity. Then the player dropout detection handler continues to check if the player is in proximity of a gateway as determined in step 341.

Player Content Synchronization Flow

Figure 25:
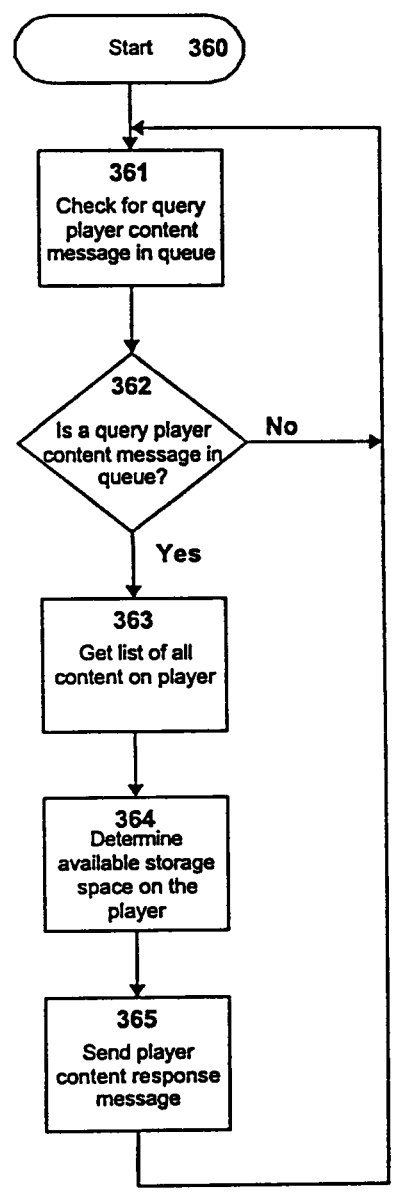
FIG. 25 is a flow diagram of the player content synchronization in accordance with the present invention.

The flow diagram for player content synchronization response is shown in FIG. 25, with content synchronization being a key capability of the invention. The content synchronization response handler in the player responds to content queries from a gateway. In this example, the content synchronization response handler is a continuously running process. The step, "Start" 360, represents the beginning of the content synchronization response handling process. The content synchronization response handler checks for a query player content message in the queue in step 361 from a gateway. If there is a query player content message in the queue as determined in step 362, then the content synchronization response handler builds a content response message by first getting a list of all the digital audio content on the player in step 363. Next, the content synchronization response handler determines the amount of available storage space on the player in step 364 for additional digital audio content. Finally, the content synchronization response handler sends a player content response message in step 365 to the gateway that sent the query player content message. The player content response message contains the list of all the digital audio content on the player as well as the amount of available space on the player. Once the content synchronization response handler sends a player content response message, as determined in step 365, to the gateway that sent the query player content message or there is no query player content message in the queue in step 362, then the content synchronization response handler checks for a query player content message in the queue again.

Player Playlist Continuation Flow

Figure 26:
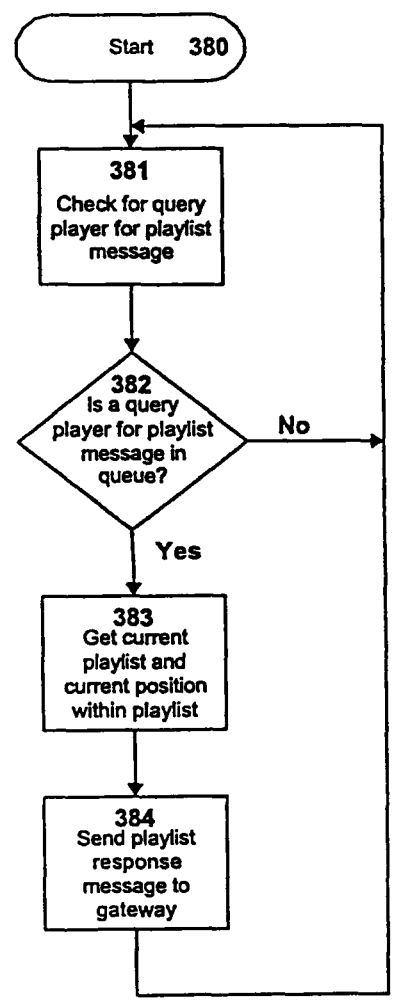
FIGS. 26 and 27 are flow diagrams of the player playlist continuation feature in accordance with the present invention.
Figure 27:
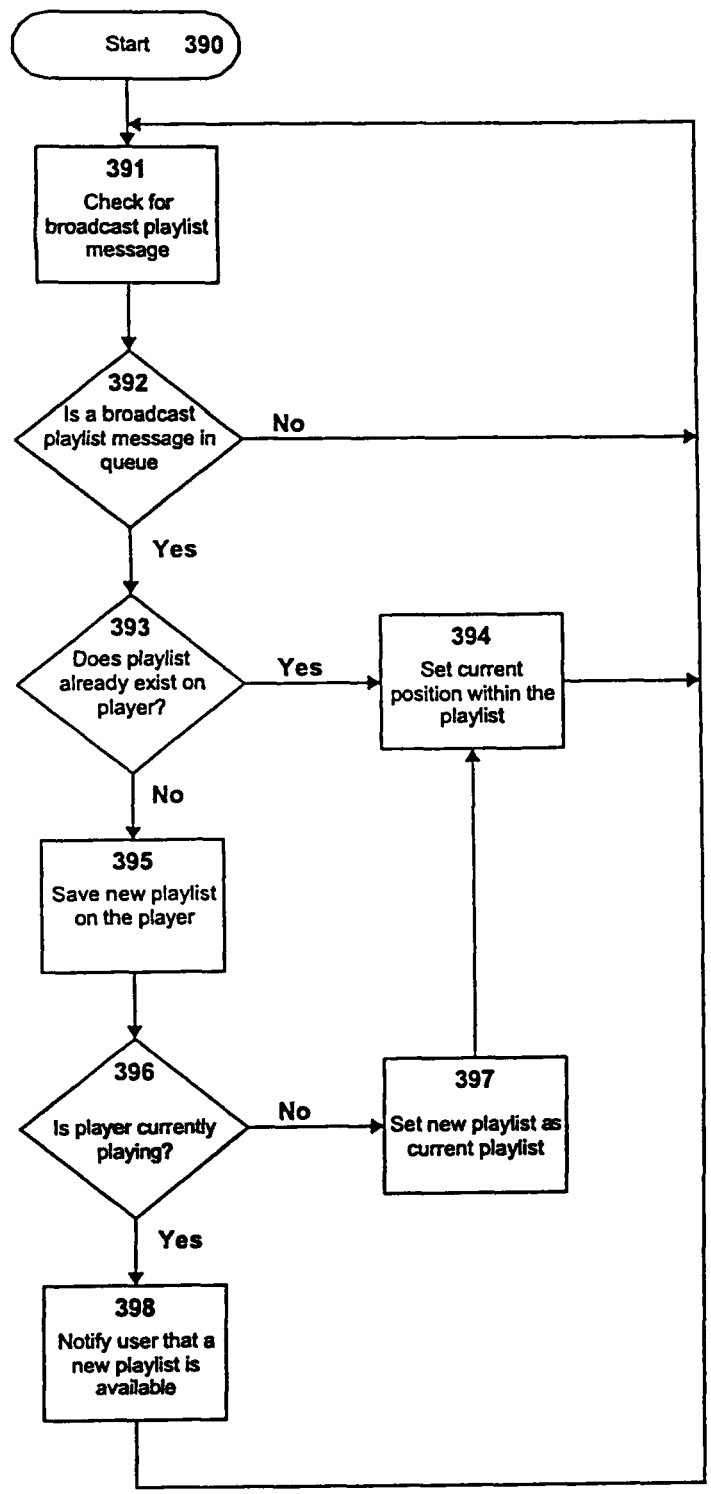

FIGS. 26 and 27 represent flow diagrams for playlist continuation response and playlist continuation updating by the player when the player detects playlist continuation query and updating attempts by an audio gateway. Playlist continuation is a key capability of the invention. In this example, the player playlist response handler and the player playlist update handler are continuously running processes. The step, "Start" 380, represents the beginning of the playlist response handling process. First, the playlist response handler checks for a query player for playlist message in the queue in step 381 from a gateway in proximity. If there is a query player for playlist message in the queue as determined in step 382, then the playlist response handler gets the current playlist and current position within the playlist in step 383 and puts this information in a playlist response message. Next, the playlist response handler sends the playlist response message to the gateway in step 384 that sent the query player for playlist message. After the playlist response handler sends the playlist response message to the gateway as determined 384 or there is not a query player for playlist message in the queue as determined in step 382, then the playlist response handler checks for a query player for playlists message 381 in the queue again.

The step, "Start" 390 (FIG. 27), represents the beginning of the playlist update handling process. First the playlist update handler checks for a broadcast playlist message in step 391 in the queue from a gateway in proximity. If there is not a broadcast playlist message in the queue as determine in step 392, then the playlist update handler just checks for a broadcast playlist message in the queue again. If there is a broadcast playlist message in the queue, as determined in step 392, then the playlist update handler checks if the playlist already exists on the player in step 393. The playlist information is found in the broadcast playlist message. If the playlist already exists on the player, as determined in step 393, then the playlist update handler activates the playlist and sets the current position within the playlist in step 394 on the player. The current position within the playlist is found in the broadcast playlist message. Then the playlist update handler checks for a broadcast playlist message in step 391 in the queue again. If the playlist does not already exist on the player as determined in step 393, then the playlist update handler saves the new playlist on the player in step 395. Next, the playlist update handler checks if the player is currently playing in step 396. If the player is not currently playing, then the playlist update handler sets the new playlist as the current playlist in step 397 and sets the current position within the playlist in step 394. If the player is currently playing, then the playlist update handler notifies the user that a new playlist is available in step 398. This allows the user to decide to play the new playlist or continue with a current playlist. Next, the playlist update handler checks for a broadcast playlist message in step 391 in the queue again.

Obviously, many modifications and variations of the present invention are possible in light of the above teachings. Thus, it is to be understood that, within the scope of the appended claims, the invention may be practiced otherwise than as specifically described above.

We claim:

1. A method comprising:
    establishing, by a first digital content device, a direct wireless communication with a second digital content device;
    receiving, by way of the direct wireless communication with the second digital content device, information regarding presentation of digital content by the second digital content device, wherein the information regarding the presentation of the digital content by the second digital content device comprises a current position of the presentation of the digital content by the second digital content device;
    receiving, by the first digital content device, a request to present the digital content to a user; and
    presenting, by the first digital content device, the digital content beginning from the current position.

2. The method of claim 1, wherein the digital content comprises at least one of audio content, video content or text.

3. The method of claim 1, wherein each of the first digital content device and the second digital content device comprises one of an audio player or a video player.

4. The method of claim 1, wherein establishing the direct wireless communication with the second digital content device comprises detecting, by the first digital content device, the second digital content device.

5. The method of claim 4, wherein detecting the second digital content device comprises detecting a position of the second digital content device within a range of a wireless network.

6. The method of claim 4, wherein detecting the second digital content device comprises detecting a position of the second digital content device within a range associated with a wireless communication platform.

7. The method of claim 1, wherein the current position of the presentation of the digital content comprises a position other than a start point of the presentation.

8. The method of claim 1, further comprising updating the current position of the presentation of the digital content based on the presentation, by the first digital content device, of the digital content.

9. The method of claim 8, further comprising sending, by the first digital content device, the updated current position to at least one other device.

10. The method of claim 1, further comprising detecting a disruption in the presentation of the digital content by the first digital content device.

11. The method of claim 10, wherein detecting a disruption in the presentation of the digital content comprises detecting a loss of the wireless communication.

12. The method of claim 11, further comprising updating the current position to represent a position of the presentation at the time of the disruption.

13. The method of claim 12, further comprising:
    reestablishing the wireless communication; and
    upon reestablishing the wireless communication, presenting, by the first digital content device, the digital content beginning from the updated current position.

14. A non-transitory computer readable medium storing instructions thereon that, when executed by at least one processor, cause the at least one processor to perform steps comprising:
    establishing, by a first digital content device, a direct wireless communication with a second content device;

receiving, by way of the direct wireless communication with the second digital content device, information regarding presentation of digital content by the second digital content device, wherein the information regarding the presentation of the digital content by the second digital content device comprises a current position of the presentation of the digital content by the second digital content device;

receiving, by the first digital content device, a request to present the digital content to a user; and presenting, by the first digital content device, the digital content beginning from the current position.

15. The non-transitory computer readable medium of claim 14, wherein the digital content comprises at least one of audio content, video content or text.

16. The non-transitory computer readable medium of claim 14, wherein each of the first digital content device and the second digital content device comprises a mobile digital content device.

17. The non-transitory computer readable medium of claim 14, wherein each of the first digital content device and the second digital content device comprises one of an audio player or a video player.

18. The non-transitory computer readable medium of claim 14, further comprising updating the current position of the presentation of the digital content based on the presentation, by the first digital content device, of the digital content.

19. The non-transitory computer readable medium of claim 14, wherein establishing the direct wireless communication with the second digital content device comprises detecting, by the first digital content device, the second digital content device.

20. The non-transitory computer readable medium of claim 19, wherein detecting, by the first digital content device, the second digital content device comprises detecting a position of the second digital content device within a range of a wireless network.

21. The non-transitory computer readable medium of claim 19, wherein detecting, by the first digital content device, the second digital content device comprises detecting a position of the second content device within a range of a wireless communication platform.

22. A mobile device comprising:

at least one processor; and a non-transitory computer readable medium storing instructions that, when executed by the at least one processor, cause the at least one processor to:

establish, by a first digital content device, a direct wireless communication with a second digital content device;

receive, by way of the direct wireless communication with the second digital content device, information regarding presentation of digital content by the second digital content device, wherein the information regarding the presentation of the digital content by the second digital content device comprises a current position of the presentation of the digital content by the second digital content device;

receive, by the first digital content device, a request to present the digital content to a user; and present, by the first digital content device, the digital content beginning from the current position.

23. The mobile device of claim 22, wherein the digital content further comprises at least one of audio content, image content or text.

24. The mobile device of claim 22, wherein the current position comprises an elapsed time of audio or video.

25. The mobile device of claim 22, wherein the current position comprises a presentation position of audio, video or text.

26. The mobile device of claim 22, further comprising instructions that, when executed by the at least one processor, cause the at least one processor to update the current position of the presentation of the digital content based on the presentation, by the mobile device, of the digital content.

27. The mobile device of claim 26, further comprising instructions that, when executed by the at least one processor, cause the at least one processor to send, by the mobile device, the updated current position of the presentation of the digital content to at least one other device.

28. The mobile device of claim 27, further comprising instructions that, when executed by the at least one processor, cause the at least one processor to detect a disruption in the presentation of the digital content by the mobile device.

29. The mobile device of claim 28, further comprising instructions that, when executed by the at least one processor, cause the at least one processor to update the current position to represent a position of the presentation at the time of the disruption.

30. The mobile device of claim 22, wherein establishing a direct wireless communication with the second device comprises detecting, by the mobile device, the second device.

31. The mobile device of claim 30, wherein detecting, by the mobile device, the second device comprises detecting a position of the second content device within a range of a wireless network.

32. The mobile device of claim 30, wherein detecting, by the mobile device, the second device comprises detecting a position of the second content device within a range of a wireless communication platform.

* * * * *